(12) United States Patent  
Sugrue et al.

(10) Patent No.: US 12,169,848 B2
(45) Date of Patent: Dec. 17, 2024

(54) GENERATING A POOL OF RISK WITH OPTION PRICING

(71) Applicant: ChaChingMe, Inc, Chicago, IL (US)

(72) Inventors: Maximillian Sugrue, Chicago, IL (US); Gary Yi, Chicago, IL (US); Noor Sugrue, Chicago, IL (US)

(73) Assignee: ChaChingMe, Inc, Chicago, IL (US)

( * ) Notice: Subject to any disclaimer, the term of this patent is extended or adjusted under 35 U.S.C. 154(b) by 0 days.

(21) Appl. No.: 18/591,333

(22) Filed: Feb. 29, 2024

(65) Prior Publication Data

US 2024/0296475 A1    Sep. 5, 2024

Related U.S. Application Data

(60) Provisional application No. 63/487,740, filed on Mar. 1, 2023.

(51) Int. Cl.
*G06Q 30/00*   (2023.01)
*G06Q 30/0242*  (2023.01)
*G05B 19/418*  (2006.01)

(52) U.S. Cl.
CPC ............... *G06Q 30/0242* (2013.01)

(58) Field of Classification Search
CPC .................................... G06Q 30/0242
See application file for complete search history.

(56) References Cited

U.S. PATENT DOCUMENTS

| | | |
|---|---|---|
| 10,699,289 B1 | 6/2020 | Dalton |
| 10,878,448 B1 | 12/2020 | Chu |
| 11,556,920 B2 | 1/2023 | Sarkissian |
| 2004/0267611 A1 | 12/2004 | Hoerenz |
| 2005/0160004 A1 | 7/2005 | Moss |
| 2006/0143080 A1 | 6/2006 | Garg |
| 2007/0239560 A1* | 10/2007 | McGuire ............... G06Q 30/08 705/14.46 |
| 2008/0300973 A1 | 12/2008 | DeWitt |
| 2011/0125561 A1 | 5/2011 | Marcus |

(Continued)

OTHER PUBLICATIONS

"Projecting Parametres Trade Electronic Platform". IEEE. 2019. (Year: 2019).*

(Continued)

*Primary Examiner* — Maria V Vanderhorst
(74) *Attorney, Agent, or Firm* — Sheppard Mullin Richter & Hampton LLP

(57) ABSTRACT

Systems and methods of predicting future interactions with devices. For example, the system may receive search criteria and determine one or more values, including an interaction value of the search criteria and a cost per views value of the search criteria. When the cost per views value exceeds a threshold value, the system may increase a dynamic cashback amount associated with the search criteria and transmit an electronic communication that includes the dynamic cashback amount, a predetermined period of time to initiate a transaction for the product, and an identifier associated with the product. When the identifier associated with the product is received in association with the transaction of the product within the predetermined of time, the system may transfer the dynamic cashback amount from the aggregation revenue pool of funds to a digital wallet of the consumer user.

20 Claims, 11 Drawing Sheets

(56) References Cited

U.S. PATENT DOCUMENTS

| | | |
|---|---|---|
| 2011/0231223 A1 | 9/2011 | Winters |
| 2012/0150606 A1 | 6/2012 | Navar |
| 2012/0303425 A1* | 11/2012 | Katzin ............... G06Q 20/4016 |
| | | 705/16 |
| 2013/0159081 A1 | 6/2013 | Shastry |
| 2014/0180790 A1* | 6/2014 | Boal ................. G06Q 30/0245 |
| | | 705/14.42 |
| 2014/0279548 A1 | 9/2014 | Wang |
| 2015/0112790 A1 | 4/2015 | Wolinsky |
| 2015/0227972 A1 | 8/2015 | Tang |
| 2016/0232560 A1 | 8/2016 | Vandevelde |
| 2017/0140357 A1 | 5/2017 | Fricke |
| 2017/0270499 A1 | 9/2017 | Coffman |
| 2017/0300968 A1 | 10/2017 | Reiver |
| 2018/0211331 A1 | 7/2018 | Winters |
| 2018/0322520 A1 | 11/2018 | Winters |
| 2020/0327573 A1 | 10/2020 | Alapati |
| 2021/0065239 A1 | 3/2021 | Hylton |

OTHER PUBLICATIONS

"A Blockchain-Based Decentralized Marketplace for Trustworthy Trade in Developing Countries". IEEE. 2022 (Year: 2022).*

Burgess, Tom, "Retail Media Networks for Banks? The Definition of a Payments Media Network", Snipp, retrieved online at <URL: https://www.snipp.com/blog/retail-media-network-for-banks-payments-media-network>, Jan. 18, 2023 (Year: 2023), 7 pages.

SnippMedia, "Payments Media Network, Tap Into Banks' Digital Channels to Extend & Optimize Your Audience", retrieved online at URL: https://www.snipp.com/hubfs/SnippMedia%20Retailer%20Product%20Sheet.pdf?hsLang=en>, retrieved on Jan. 20, 2023, 1 page.

SnippMedia, "Powering Brand Funded Rewards (BFR's) to Build Card-Holder Loyalty", retrieved online at <URL: https://www.snipp.com/hubfs/Resources/Snipp%20Product%20Sheets/SnippMedia%20BFR%20Product%20Sheet%20.pdf?hsLang=en>, retrieved on Jan. 20, 2023, 1 page.

* cited by examiner

GENERATING A POOL OF RISK WITH OPTION PRICING

CROSS-REFERENCE TO RELATED APPLICATIONS

This is a non-provisional patent application of U.S. Patent Application No. 63/487,740, filed Mar. 1, 2023, which is hereby incorporated by reference in its entirety for all purposes.

This application is also related to U.S. patent application Ser. No. 17/689,149, filed Mar. 8, 2022, which is herein incorporated by reference in its entirety.

TECHNICAL FIELD

The disclosed technology relates generally to providing and maintaining a platform to predict future interactions with devices through the analysis and transmission of various electronic communications.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1:
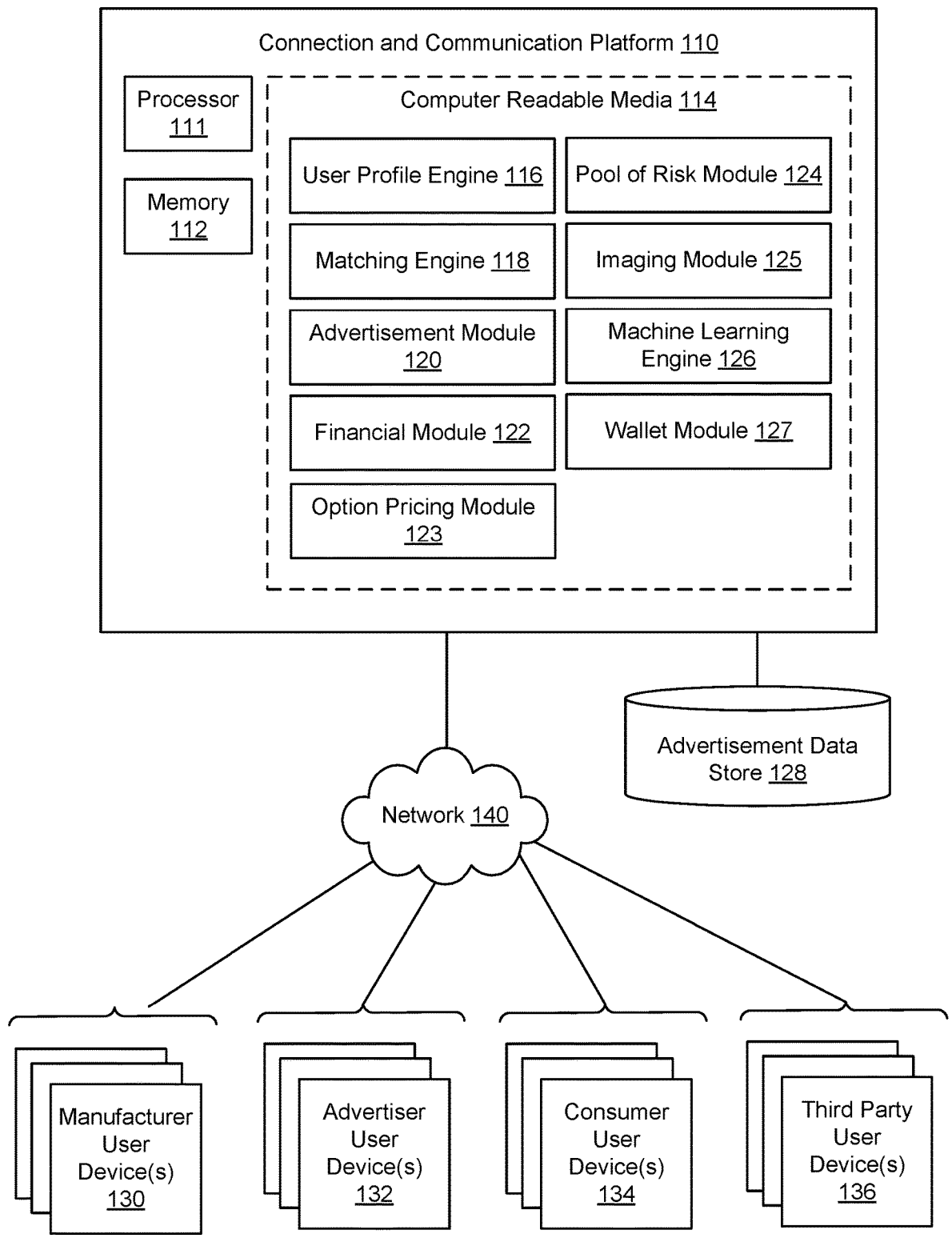
FIG. 1 is an illustrative connection and communication platform, in accordance with the embodiments disclosed herein.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Traditional communication systems provide electronic communications to users in various ways. In the context of advertisements, which is a specific form of electronic communication, old systems may provide mailers or generic advertisements or coupons to users by transmitting the advertisement to the user once the consumer user signs up for a marketing campaign. The advertisements may be sent to the consumer user on a weekly or monthly basis via physical mail or electronic mail. When the consumer provides the mailer or generic advertisement to a merchant, or when they select a link in an electronic mail advertisement, the merchant might discount the price of the item or product (used interchangeably) based on the value presented in advertisement. Other older advertising systems may track a consumer user's online activity and attempt to predict which items the consumer user may be interested in, without requiring the consumer user to sign up for the mailing campaign. The advertising system can preemptively show an advertisement (e.g., in a social media context, etc.) that displays an item in hopes that the consumer user will visit a manufacturer or merchant (e.g., online store, physical brick and mortar store, etc.) to purchase the item associated with the advertisement. The consumer can select a link in a digital advertisement that directs the consumer user to the particular manufacturer or merchant, which can discount the price of the item based on the value presented in advertisement, introduce a new product or service offering to the consumer, or serve other marketing objectives. However, most of these advertisements are initiated by manufacturer, merchant, or advertiser users attempting to sell more of the product without consideration for what the consumer user specifically intends to purchase on a particular day, either directly to the consumer user or via another medium such as social media.

Embodiments of the application identify technically-innovative systems and methods from multiple perspectives. For example, a connection and communication platform can implement algorithms and data analytics to computationally measure and predict user behavior with unprecedented granularity, speed, and accuracy, as an improvement to traditional systems that attempt to predict user behavior without generating input data or creating the electronic connections. In some examples, a software application at a consumer device or the connection and communication platform can pose one or more prompts to the consumer user associated with their planned future purchases and store the prompt/response as input data to the connection and communication platform. The prompts may ask the user if they intend to initiate a future purchase of an item type and what item type they plan to purchase in a time range (e.g., the next 24 hours, etc.). Alternatively, a software application at a consumer device or the connection and communication platform can present a featured product or item types to the user, for example as a recommendation, which can prompt the consumer user to purchase the product or item type during the time range. Search may be used in general to describe the process of retrieving item types based on either direct user input, such as natural language search, or indirect user input, such as their usage history.

Item types may cover various characteristics. For example, an item type may correspond with a generic item description, including a shirt or pants, books, kitchenware, a lawnmower, and the like. In another example, the item type may correspond with a particular item description, including a brand (e.g., Acme Co., etc.) or trademark name of an item. In another example, an item type may correspond with a general activity or event associated with using the item, including items for going on a ski trip, gardening items, back to school supplies, and the like.

Based on the item type that the consumer user identifies, the application or platform may provide a set of advertisements for items related to the item type that the consumer user plans to purchase, along with a time limit and monetary reward for completing the future purchase. The consumer user may select one or more of the advertisements and the advertisement details can be stored in association with the user at the consumer device or connection and communication platform. In some examples, the consumer user may view each advertisement of the set of advertisements and select one or more from the set. When the future purchase is made within the time limit, the monetary reward for completing the purchase may be transmitted from a first digital wallet (e.g., advertiser, manufacturer, merchant, platform operator, etc.) to the digital wallet associated with the consumer user.

From a manufacturer user's perspective, the connection and communication platform may receive a trigger notification of a future purchase of an item type. The future purchase may be associated with a consumer user device (e.g., a client device, a consumer user, etc.). Upon receiving the trigger notification, the platform may initiate a matching procedure that correlates the item type with an item identifier in an item database of an item manufacturer or alternative third-party data source. The platform may determine an alert notification associated with the item identifier of the item manufacturer and enable transmission of the alert notification to the consumer user device. In some examples, the alert notification is an advertisement to reduce a cost of an item (e.g., for the consumer user) in the future purchase.

From an advertiser user's perspective, the connection and communication platform may receive a trigger notification of a future purchase of an item type. The future purchase may be associated with a consumer user device (e.g., a consumer user, user account, printed receipt, client data associated with the user, etc.). Upon receiving the trigger notification, the platform may initiate a matching procedure that correlates the item type with a set of advertisements generated by an item advertiser (e.g., received in an advertising exchange computer network, etc.). The platform may provide the set of advertisements to the consumer user device and receive a selection of one more advertisement(s) from the set of advertisements. The selection may identify an item identifier associated with the first advertisement that will be acquired as the future purchase in association with the consumer user device. In some examples, the alert notification is an advertisement to apply the future purchase.

From a consumer user's perspective, the connection and communication platform may receive a search term or some search criteria (used interchangeably) from a user device where the search criteria corresponds with an item type. In some examples, the search criteria may be based on a recommendation initiated by the consumer user device or the platform based on usage history by the consumer user. In other words, the search criteria may be based on direct user input (e.g., natural language search) or indirect user input (e.g., the usage history or inferred product/item type preferences of the consumer user). The platform may initiate a matching procedure that correlates the item type with a set of advertisements from a set of item manufacturers (e.g., received in an advertising exchange computer network, etc.), vendors, merchants, or other parties that may provide advertisements for items. The platform may provide the set of advertisements to the user device and receive a selection of one or more advertisement(s) from the set of advertisements. The selection may identify an item identifier associated with the first advertisement that will be acquired as a future purchase in association with the user device. In some examples, the future purchase is limited to a predetermined time frame from receiving the selection of the first advertisement. In some examples, the platform may receive a confirmation of the future purchase from the user device and initiate a credit transfer to a wallet account associated with the user device.

Various technical advantages are provided throughout the disclosure. For example, the connection and communication platform may generate input data and form electronic connections between devices where none existed previously, or initiate actions outside of the electronic environment through the transmission of the electronic connections. Additionally, the platform may help reduce electronic processing and communications by associating a future purchase (e.g., that the consumer user pre-emptively identifies) with an advertisement for the item type involved in the future purchase. The platform may not need to process millions of digital interactions between the consumer user device and other platforms (e.g., social media, purchase histories, etc.) in order to predict or infer what item type(s) the user might purchase within a limited time frame because the consumer user may explicitly inform the platform of this information. The platform may be simplified and scaled down, resulting in fewer processing resources needed to determine this information, fewer electronic communications and models, and improved data accuracy and consumer users' transactional conversion ratios overall.

FIG. 1 is an illustrative connection and communication platform, in accordance with the embodiments disclosed herein. The system may comprise connection and communication platform 110 in communication with one or more manufacturer user devices 130, one or more advertiser user devices 132, and one or more consumer user devices 134 via network 140. Connection and communication platform 110 may include processor 111, memory 112, and computer readable media 114 comprising a plurality of engines and modules to enable functionality described throughout the disclosure. For example, computer readable media 114 may include user profile engine 116, matching engine 118, advertisement engine 120, financial module 122, option pricing module 123, pool of risk module 124, imaging module 125, machine learning engine 126, and wallet engine 127.

The user may access connection and communication platform 110 via network 140 using manufacturer user device 130, advertiser user device 132, and consumer user device 134 (e.g., mobile device, personal computer, etc.) for various purposes. For example, manufacturer user device 130 may interact with connection and communication platform 110 to provide a list of items that are available for future purchases (e.g., including manufacturer of items, data processor, reseller of items, etc.). In another example, advertiser user device 132 may interact with connection and communication platform 110 to receive a list of items to advertise for future purchases and provide a set of advertisements for those items. In another example, consumer user device 134 may interact with connection and communication platform 110 to receive the set of advertisements and provide a selection of one or more advertisements or items.

User profile engine 116 is configured to generate a user profile for one or more users, including users associated with one or more manufacturer user devices 130, one or more advertiser user devices 132, and one or more consumer user devices 134. The user profile may comprise user device information for the device that is operated by the user (e.g., a device or mobile identifier, Service Set Identifier (SSID), Identifier for Advertisers (IDFA), etc.).

The user information may be associated with a plurality of characteristics. Some of the user information may be based on the user type. For example, a manufacturer user may be associated with a name (e.g., individual or company entity, etc.) and one or more items the user manufacturers. In another example, an advertiser user may be associated with a name (e.g., individual or company entity, etc.) and one or more items the user advertises. In another example, a consumer user may be associated with a name (e.g., individual or company entity, etc.), one or more items the user plans to identify as a future purchase, advertisement history, order history, and other relevant information.

User profile engine 116 is configured to pose or provide (used interchangeably) one or more prompts to the consumer user associated with their planned future purchases and store the prompt/response as input data to the connection and communication platform. The input data may be used to train the machine learning model discussed with machine learning engine 126.

Matching engine 118 is configured to receive search criteria that corresponds with an item type and initiate a matching procedure that correlates the item type with various information. The search criteria may be received from consumer user device 134 or other user device. In some examples, the matching procedure may correlate the item type with an item identifier in an item database of an item manufacturer associated with manufacturer user device 130. In some examples, the matching procedure may correlate the item type with a set of advertisements from a set of item manufacturer (or merchants, vendors, other parties that generate advertisements, etc.).

In some examples, the search criteria is based on direct user input (e.g., natural language search) or indirect user input (e.g., the usage history or inferred product/item type preferences of the consumer user). Matching engine 118 is configured to determine the search criteria based on either type of user input.

Matching engine 118 is also configured to receive the item type from consumer user 134 and route the item type to an advertising exchange computer network associated with a plurality of advertiser user devices 132. The advertising exchange computer network may be a distributed set of computing devices, each of which are associated with a single advertiser user device 132. In some examples, the advertising exchange computer network may correspond with a digital marketplace that enables a plurality of advertiser user devices 132 (e.g., including advertisers, publishers, offer/coupon entities, affiliate networks, etc.) to buy and sell advertising space in real-time (e.g., through a real-time auction of the advertising space, etc.).

In some examples, advertisements may be provided by the plurality of advertiser user devices 132 and matching engine 118 can select one or more advertisements that match the item type selected by consumer user device 134. These selected advertisements may be provided to consumer user device 134.

In some examples, matching engine 118 can provide the item type to the advertising exchange computer network (e.g., as a real-time request that is posted or distributed to the network) and the plurality of advertiser user devices 132 may provide one or more advertisements in response. Matching engine 118 may receive the generated advertisements and confirm that the item type included in the advertisement matches the item type requested (e.g., via OCR, parsing algorithm, etc.). In some examples, the item type can be considered a user keyword that is matched to information included in the advertisement that is relevant to the consumer user. These selected advertisements may be provided to consumer user device 134.

Advertisement module 120 is configured to generate an advertisement for advertiser user device 132 and/or receive an advertisement from a third party (e.g., the advertising exchange computer network, etc.). The advertisement may comprise an item identifier, a manufacturer, a value (e.g., a discount offer to apply to the price of a future purchase for a particular item type, a coupon to provide to an item manufacturer for a particular item type, etc.), a monetary reward, and a time range that the advertisement is active. The advertisements may be stored in advertisement data store 128 (e.g., item type, advertisement information, time frame, manufacturer, etc.).

Advertisement module 120 is also configured to provide a set of advertisements to a user device. In some examples, the consumer user may view the advertisement of the set of advertisements and select one or more from the set. The device (e.g., consumer user device 134) may display the advertisements at the graphical user interface and allow interaction with the advertisements. The advertisement may be selected by consumer user device 134 and the selection may be transmitted back to advertisement module 120. Advertisement module 120 may associate the advertisement with the consumer user.

Advertisement module 120 is also configured to filter advertisements based on a location of consumer user device 134. For example, a geolocation (dynamic) and/or mailing location (static) may be identified for consumer user device 134. The advertisements within a location range may be determined and provided to consumer user device 134 for selection. In another example, the advertisement may be targeted to the consumer user device based on previous interaction activities, consumer user characteristics, or other features that may correlate the advertisement to the consumer user.

A marketplace of advertisements may store a set of advertisements for an item type or specific product. Each advertisement may be associated with an identifier. The advertisements may be generated by advertiser user devices and stored in the marketplace of advertisements, and subsequently downloaded by advertisement module 120.

Advertisement module 120 is also configured to determine a time range for applying the advertisement to the future purchase. For example, a selection of an advertisement may be received. The time range may start when the selection is received. The advertisement may be applied to the future purchase for a predetermined time range (e.g., 24 hours, etc.) such that the discount associated with the advertisement may only apply if a confirmation of the future purchase is received within the time range (e.g., an image of a sales receipt from the manufacturer, etc.). When the future purchase is made within the time limit, the monetary reward for completing the purchase may be transmitted from a first digital wallet (e.g., advertiser, manufacturer, merchant, platform operator, etc.) to the digital wallet associated with the consumer user, as described with wallet module 127.

Financial module 122 is configured to receive information associated with a payment instrument, for example, from payments module 624 (illustrated in FIG. 6) associated with consumer user device 134. For example, the consumer user may complete the future purchase following specific checkout instructions dictated by connection and communication platform 110 or the corresponding application at consumer user device 134, for example, using a payment method on file with or issued by connection and communication platform 110. In this instance, financial module 122 may receive information associated with the financial transaction events (e.g., authentication, authorization, charge, settlement, reversal, dispute, etc.) generated on that payment method.

Financial module 122 is configured to validate purchases. The information may include the merchant's billing identifier, location, time of transaction, currency of transaction, amount of transaction, or other information associated with the transaction or entities involved. In some examples, financial module 122 may compare the transaction information with the consumer user's searches and clicks at consumer user device 134. The comparison may help verify completion of consumer purchases as well as detect returns.

The transaction information may be received from various sources, including a payment processor (such as PayPal®), a payment network (such as Mastercard®), or a cloud-based platform that accesses and provides the transaction information. In some examples, the information may be received from the respective secure consumer payment partner ("CPP") associated with the transaction with low latency (e.g., as a stream of transactions or as a direct electronic communication). In any of these illustrative examples, financial module 122 may receive an automatic stream of electronic communications associated with the transaction/event (e.g., pushed by the CPP or retrieved from the CPP). In other examples, financial module 122 may query and pull such electronic communications.

Financial module 122 is configured to determine reversals from the stream of transactions. Any detected reversals may be provided/stored in user profile engine 116. The consumer user may be associated with a return tendency score and the score may be updated in association with the data provided to financial module 122. For example, the return tendency score may be increased when a return of the item is initiated through consumer user device 134. In some examples, the return may affect machine learning engine 126 in pricing dynamic rewards for that consumer user.

Option pricing module 123 is configured to receive search criteria from a user device, where the search criteria corresponds with an item type, and the option pricing module may use the search criteria to find advertisements of products in a marketplace of advertisements that match the search criteria. The advertisements may be previously-loaded and stored with advertisement data store 128 or dynamically received from advertiser marketplace using the corresponding search criteria.

In some examples, "option pricing" may refer to a dynamic or static value associated with an optional attribute. The optional attribute may refer to a reward or incentive that may also be dynamic. As an illustrative example, the option pricing may be adjust to increase the value of a reward or incentive for interacting with a website or advertisement. The value of the option pricing may be transferred from a first wallet to a second wallet in response to the interaction.

The advertisements of products from the marketplace may be provided to consumer user device 134. The consumer user may select the advertisement displayed at consumer user device 134 that corresponds with the product that they intend purchase during a limited time period. When the consumer purchases the product during the limited time period, the cashback amount associated with the selected advertisement may be transmitted to the wallet of the consumer from the wallet of advertiser.

In some examples, an advertisement of a product in the marketplace may correspond with a cashback amount that is static or dynamic. In either example, the cashback amount may be transferred from a pool of funds to a wallet of the consumer user in exchange for identifying an intended purchase of the product, sending a notification of the intended purchasing activity to the platform, and completing the intended purchase within a predetermined timeframe. In some examples, the cashback amount is adjustable based on search criteria, where each term of the search criteria may be associated with a different cashback amount.

In some examples, the cashback amount may be stored in an aggregation revenue pool of funds associated with an advertiser user or advertiser marketplace until it is transferred by the wallet module(s). In some examples, the aggregation revenue pool of funds is associated with connection and communication platform 110 and not the advertiser users directly, until it is transferred by the wallet module(s). In still other examples, the aggregation revenue pool of funds is transferred to a wallet of connection and communication platform 110 from the advertiser user or advertiser marketplace, and then transferred to the wallet of the consumer user.

In some examples, the funds may be removed from a first digital wallet by wallet module 127 and added to a second digital wallet. The first digital wallet may be managed by advertiser user device 132 (or connection and communication platform 110) and the second digital wallet may be managed by consumer user device 134 (or connection and communication platform 110).

The static cashback amount may be determined by the manufacturer or the advertiser at the time of creating the advertisement of the product. The static cashback amount may be displayed with the advertisement to the consumer user at the consumer user device. In some examples, the static cashback amount and corresponding advertisement may be ranked from largest to smallest at the display, and the user may select the advertisement corresponding with the largest static cashback amount.

The dynamic cashback amount may be determined based on various factors. For example, the dynamic cashback amount may be algorithmically determined based on click/interaction metrics, cost per thousand views (or cost per mille where "mille" is Latin for a thousand) (CPM), cost per click (CPC), or other metrics. These click/interaction metrics, CPM, CPC, and other values may quantify a number of interactions with websites that are performed by the consumer user or other users (e.g., a number of "clicks"). A set of interactions may generate funds according to the quantified metrics. As the funds accumulate, the dynamic cashback amount may also increase in correlation with the accumulated interactions and funds received for the product.

As an illustrative example, if the system contains just one user, and that user interacts with (e.g., clicks) an average of ten websites prior to purchasing a product, the cost per click/interaction may be multiplied by ten. Each interaction may be associated with a different website (e.g., ten websites) or the same website. When the cost per click/interaction is two dollars per click, the interactions performed by the consumer user may identify the value of these interactions to advertiser users (e.g., with ten clicks leading to a purchase, the value of the interactions of the consumer user is twenty dollars). The wallet of the consumer user may receive a transfer of funds associated with the interactions (e.g., twenty dollars), minus any administrative fees removed by connection and communication platform 110, or other algorithmic determinations discussed herein. Of course, as disclosed below, the system is designed to support more than one user and aggregate the funds generated by them and distribute funds to actual purchasers as an incentive.

Other cost per interaction calculations may be implemented as well. For example, option pricing module 123 may determine an Equivalent Cost-Per-Action (eCPA) using an eCPA Estimation algorithm or may determine a cost per action (CPA) Variance (CPA-var) using a CPA-var Estimation algorithm. The determination may identify, for example, advertisement content signals (e.g., text or imagery), advertisement meta signals (e.g., CPM/CPC history, advertiser/merchant profile, or other action history), consumer signals (e.g., past consumer click, purchasing pattern, or other signal history), or product signals (e.g., product information, price, reviews, etc.).

Option pricing module 123 is also configured to determine a likelihood of conversion. In some examples, the likelihood of conversion may indicate a probability that the user will purchase an item associated with the series of interactions with websites. For example, some consumer users may interact with the series of websites and purchase a product associated with the interactions, and some consumers may interact with the websites without purchasing the product (e.g., window shopping). As such, the probability value associated with the likelihood of conversion for the consumer users that do not purchase the product may be less than a threshold amount whereas the probability value associated with the likelihood of conversion for the consumer users that purchase the product may exceed the threshold amount.

In some examples, the determination of the likelihood of conversion may also determine a Click Likelihood Estimation (CLE) using a CLE algorithm and a Purchase Likelihood Estimation (PLE) using a PLE algorithm. The determination may identify, for example, advertisement content signals (e.g., text or imagery), advertisement meta signals (e.g., CPM/CPC rate history, advertiser/merchant profile, or other action history), consumer signals (e.g., past consumer click, purchasing pattern, or other signal history), product signals (e.g., product information, price, reviews, etc.), consumer profile data, account history data (e.g., past purchase history, etc.), product preference information, and consumer query information.

Option pricing module 123 is also configured to determine a Reward Pool Estimation (RPE) using a RPE algorithm. The determination may identify, for example, the CPC/CPM funds available, query and display volumetric trends, and payout history and trends for specific ad/product; CPC/CPM funds available, query and display volumetric trends, and payout history and trends for corresponding product category; or CPC/CPM funds available, query and display volumetric trends, and payout history and trends throughout the past purchase history.

Option pricing module 123 is also configured to determine a Reward Quote (RQ) using a RQ algorithm. The determination may identify, for example, each of the inputs from the preceding algorithms, including eCPA, CPA-var, CLE, PLE, and RPE algorithms and aggregate the analytics to determine a new option pricing model.

Option pricing module 123 is also configured to determine the maximum amount that the dynamic cashback amount can be, which can take into account the CPM or CPC rates as incoming funds and the dynamic cashback amount as outgoing funds. The CPM or CPC, in aggregate or on average, may be the maximum amount provided to the consumer user in exchange for purchasing the product (with administrative fees reduced from the dynamic cashback amount).

In some examples, the maximum amount that the dynamic cashback amount can be calculated using individual consumer behavior patterns as a data signal (e.g., the consumer's purchasing pattern). Other examples may include determining a flat amount for each consumer, which may be similar to a static cashback amount.

In some examples, the dynamic cashback amount may be reduced when an advertisement is associated with a plurality of interactions that exceed a threshold amount. In other words, the advertisement or associated product may be hyper-appealing to consumers.

In some examples, the dynamic cashback amount may be increased or reduced based on a cost per interaction of each merchant user.

Pool of risk module 124 is configured to help determine the static cashback amount or the dynamic cashback amount for each advertisement received from advertiser marketplace 820, and provide funds for the static or dynamic cashback amount from the pool of funds. As discussed herein, the funds from the pool of funds may be transferred to the wallet of the consumer user for purchasing activity associated with the platform.

Third party user devices 136 may also interact with connection and communication platform 110 to provide funds from a wallet associated with the third party to the pool of funds. Third party user devices 136 may comprise components similar to other user devices described throughout the disclosure, including manufacturer user device 130, advertiser user device 132, and consumer user device 134. Third party user devices 136 may be operated by various entities, including hedge fund entities that offer to fund the cashback amount to the consumer that selects the particular advertisement.

In some examples, connection and communication platform 110 may create a third party marketplace to fund the pool of funds. The third party entities that participate in the pool of funds may each have their own wallet to transfer funds from their possession to the pool of funds (e.g., as a corresponding wallet associated with connection and communication platform 110). When the third party entities are hedge fund entities, the pool of funds may receive funds from the wallet accounts of each hedge fund entity to combine the funds into the pool of funds.

Pool of risk module 124 is also configured to determine or modulate the static cashback amount or the dynamic cashback amount for each advertisement based on risk associated with the transaction. For example, when the cost per click is two dollars per click, the interactions performed by the consumer user may identify that the interactions performed by the user equated to two dollars, multiplied by the average number of actions (e.g., with ten actions, the value of the interactions of the consumer user is twenty dollars). When the product purchase is initiated by the consumer user, the cashback amount may be transferred to the wallet of the consumer user from the pool of funds.

Pool of risk module 124 is also configured to determine the amount of risk associated with the fund transfer process. The fund transfer process may come with risk to the third party entity. The risk may include instances where the consumer returns the product and keeps/maintains the cashback amount, the advertiser user does not pay the funds associated with the selected advertisement by the user (e.g., prior to the product purchase), and credit risks to the payors. The amount of interest rate that the third party may charge for funding the cashback amount may be sufficient to cover the risk of funding the cashback amount.

As an illustrative example, if a user interacts with (e.g., clicks) an interface ten times prior to purchasing a product, and the interactions include ten websites, the cost per click/interaction (e.g., two dollars) may be multiplied by ten. The third party entity may fund the pool of funds to cover the cost per click/interaction calculation, with a calculation of risk and expectation that the value of the purchase of the product will provide a transfer of funds from another source (e.g., the advertiser or manufacturer users). In the example of third party users as hedge funds, the hedge funds may offer to transfer the highest amount of funds to the pool of funds in exchange for collecting the cost per click/interaction (e.g., two dollars) amount.

In some examples, the dynamic cashback amount may be reduced or increased in association with the risk of the transaction. For example, when an advertisement is associated with an advertisement or associated product that is hyper-appealing to consumers, the risk may be lower because other consumers may ultimately purchase the product or the product will be less likely to be returned.

When the risk of a particular consumer exceeds a threshold value, the platform may limit interactions with the particular consumer user device. For example, the consumer user may be limited to a number of dollars per month in exchange for searches/purchases of products, or the platform may cancel/turn off the wallet/account of the consumer user.

Imaging module 125 is configured to receive an image that identifies a proof of the future purchase. The image may be analyzed (e.g., using optical character recognition (OCR), etc.) to identify components of the image, including an item, item identifier, item type, merchant name, merchant address, and other information pertaining to the future purchase. The item type (e.g., generic item, specific item, activity or event for using the item, etc.) may be matched with an item type in an advertisement transmitted to consumer user device 134 (by matching engine 118).

Figure 6:
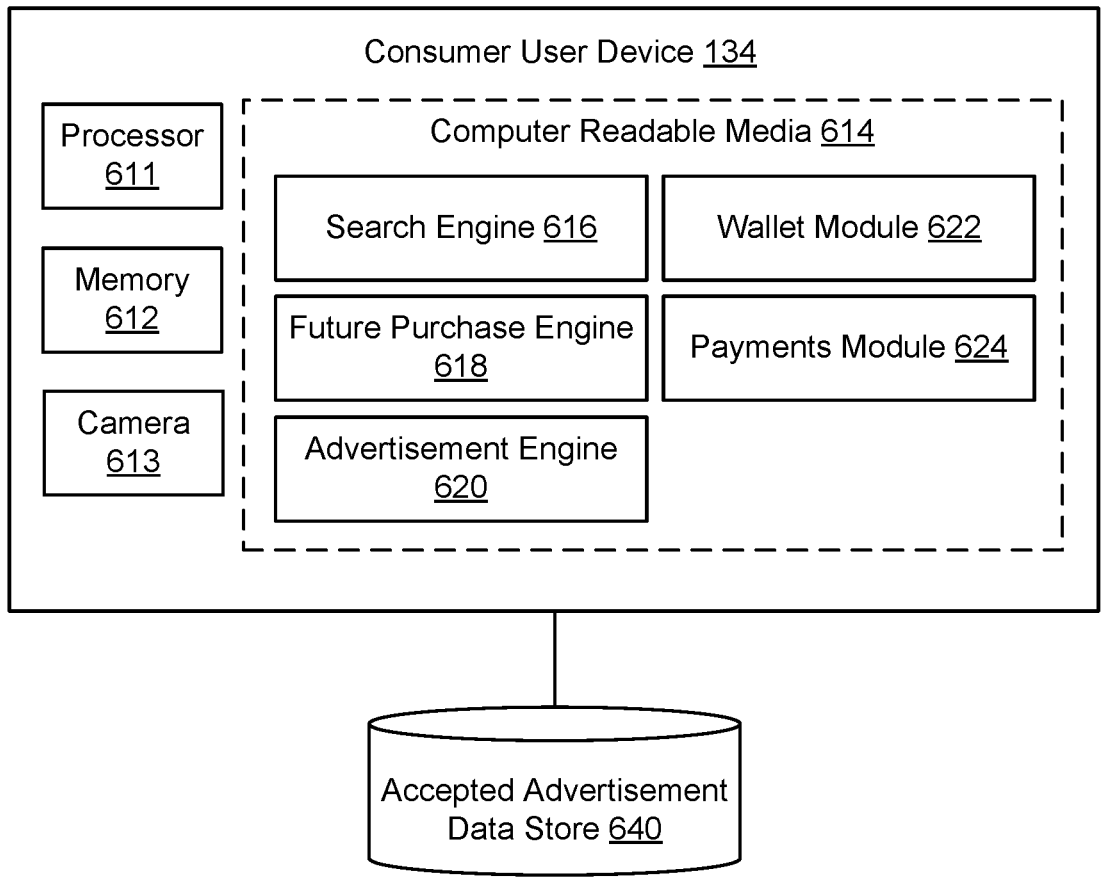
FIG. 6 is an illustrative consumer user device, in accordance with the embodiments disclosed herein.

In some examples, the image is captured by camera 613 of FIG. 6 associated with a consumer device. The image may be captured after a purchase of the item and transmitted to imaging module 125.

Machine learning engine 126 is configured to determine a likelihood of success of completing the future purchase in association with the advertisement between the manufacturer user, advertiser user, and consumer user. This may be stored as a future purchase completion score. For example, the platform may identify that the consumer user is ninety percent likely to complete the future purchase that it identified in the time range (e.g., user characteristic), so the advertisement may be selected or altered based on this information (e.g., less discount or rewards values, expanded models available corresponding to the item type, etc.).

As a sample illustration, the purchase history of the consumer user may comprise a monthly purchase of a particular brand of cereal. The input to machine learning engine 126 may identify the selection of the cereal item type by the consumer user. the output from machine learning engine 126 may identify a higher likelihood of a future purchase of the consumer user in accordance with the pattern (e.g., future purchase completion score above a threshold value). In response to the output, the discount value of the advertisement may be adjusted to provide a lower value when the consumer user identifies that it intends to initiate a future purchase for the cereal item type. In another example, the discount value of the advertisement may be adjusted higher to encourage the consumer user to switch brands from the recurring particular brand of cereal to a new brand.

Machine learning engine 126 is also configured to determine a return tendency score. The return tendency score may identify a likelihood that the consumer user will purchase a product associated with an advertisement provided through the platform, and then subsequently return the item. The return tendency score may be increased with each additional return. The advertisement value or cashback amount may be decreased based on the return tendency score exceeding a threshold value.

Machine learning engine 126 is also configured to determine availability and/or filtering of advertisements and items. For example, the advertisements may be removed based on the status of the product (e.g., unavailable or low in stock) or based on the user profile. For example, when the consumer user corresponds with a future purchase completion score above a threshold value, the advertisements may be filtered to remove/add particular advertisements.

Wallet module 127 is configured to track funds associated with users. For example, a first digital wallet may be associated with consumer user device 134 and a second digital wallet may be associated with advertiser user device 132 or platform operator. When the proof of the future purchase is received (by imaging module 125), wallet module 127 may initiate a transfer of funds to the first wallet (e.g., associated with consumer user) from the second wallet (e.g., associated with advertiser user) as payment for completing the future purchase. The funds from the digital wallet may be transferred to a digital wallet or account that is external to connection and communication platform 110 as well (e.g., via Automated Clearing House (ACH) transfer, etc.).

The amount transferred by wallet module 127 may be adjusted, as described herein. For example, the item type may be matched with an item brand as search criteria from a consumer user device and when the future purchase deviates from the initial search criteria or advertisement, the amount transferred by wallet module 127 may be reduced. In another example, the amount transferred by wallet module 127 may be reduced based on a return tendency score for the consumer user exceeding a threshold value.

In some examples, wallet module 127 may generate and transmit a function call to a third party entity (e.g., Plaid®) to maintain the digital wallet. For example, wallet engine 127 may interface with consumer user device 134 to determine the advertisements and/or offers and the values of funds to be added to the digital wallet of the consumer user. Wallet engine 127 can generate an encrypted and/or digitally signed electronic message to identify the funds to transfer from a first wallet to a second wallet (which are maintained by the third party entity), interact with the third party entity to provide security restricting access to the funds, and the like. The third party entity can interface with issuer banks or other entities to implement the exchange of funds.

In some examples, wallet module 127 may correspond with a third party entity to supplement a verification of a future purchase. This may be verification process may be in addition to or in lieu of financial module 122 and imaging module 125.

Figure 2:
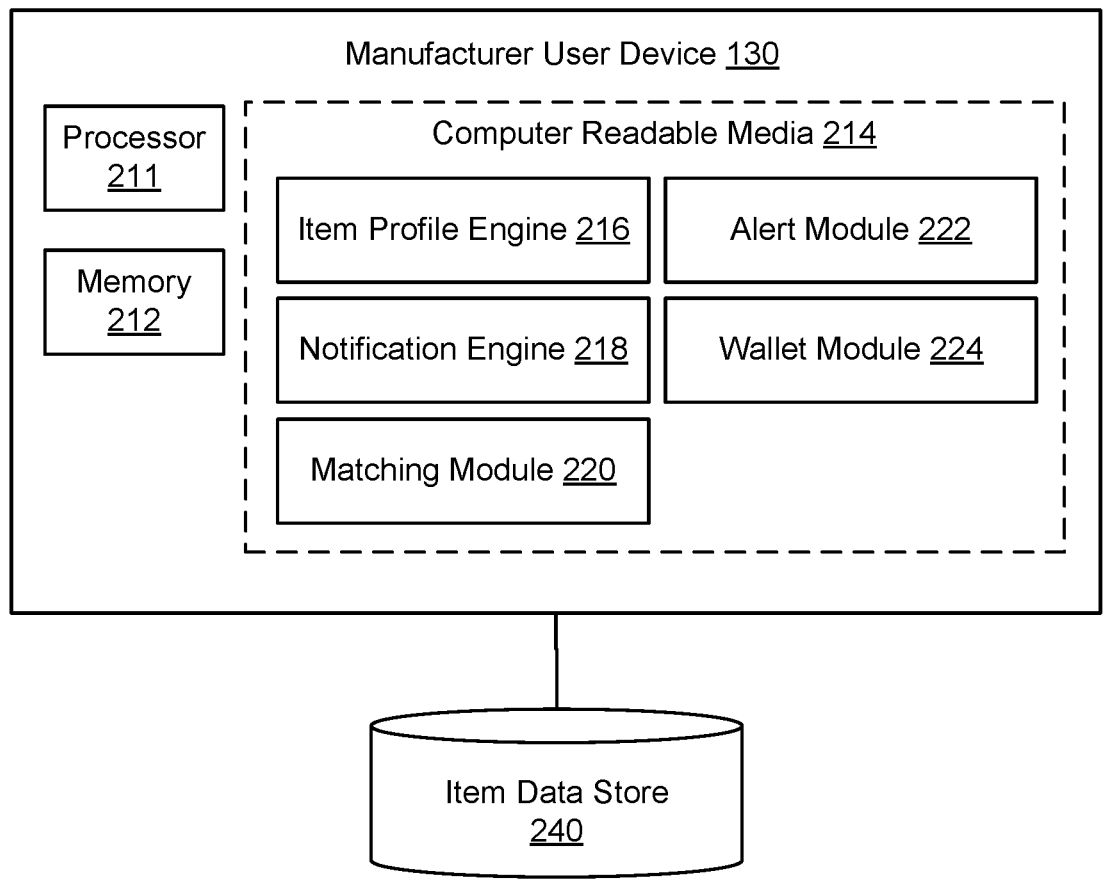
FIG. 2 is an illustrative manufacturer user device, in accordance with the embodiments disclosed herein.

FIG. 2 is an illustrative manufacturer user device, in accordance with the embodiments disclosed herein. As illustrated, some of the processing may be implemented at manufacturer user device 130 or may remain at connection and communication platform 110. Manufacturer user device 130 may include processor 211, memory 212, and computer readable media 214 comprising a plurality of engines and modules to enable functionality described throughout the disclosure. For example, computer readable media 214 may include item profile engine 216, notification engine 218, matching module 220, alert module 222, and wallet module 224.

Item profile engine 216 is configured to generate an item profile for a product offered by a merchant user. The product may be associated with an item type that is searchable. For example, the consumer user may operate a consumer user device and interact with the user interface to provide search criteria for the item type or product. The item profile is based on product information from the item data store 240 and may also comprise, for example, a location of the physical item or distance between the physical item and a determined location of the consumer user. The item profile may comprise a stock-keeping unit (SKU) for the product. The item profile may be transmitted to connection and communication platform 110 and stored or cached in advertisement datastore 128 for use by matching engine 118 to respond to consumer search criteria.

An advertisement may be associated with the item or product. The advertisement may comprise any information stored with the item profile for the product.

Notification engine 218 is configured to receive a trigger notification of a future purchase of an item type. The future purchase may be associated with a consumer user device (e.g., a user device, a consumer user, etc.).

Matching module 220 is configured to initiate a matching procedure that correlates the item type with an item identifier in an item database of an item manufacturer or alternative third-party data source. For example, upon receiving the trigger notification, the platform may initiate the matching procedure.

In some examples, the matching procedure matches the product with the purchase initiated by the consumer user.

Alert module 222 is configured to determine an alert notification associated with the item identifier of the item manufacturer and enable transmission of the alert notification to the consumer user device. In this example, the alert notification may comprise an advertisement of the product. In some examples, the alert notification identifies a cost reduction of an item (e.g., for the consumer user) in the future purchase.

Wallet module 224 is configured to track funds and initiate transfers between digital wallets that are associated with users. For example, a first digital wallet may be associated with consumer user device 134 and a second digital wallet may be associated with merchant user device 130.

Item data store 240 may comprise information on a plurality of items that the manufacturer users provides for future purchases for consumer users. Information on the plurality of items may comprise, for example, item name, item type, item description, image (e.g., of the item to add to the advertisement, etc.), location to purchase the item (e.g., URL, physical location, etc.), stock keeping unit (SKU), and price.

Figure 3:
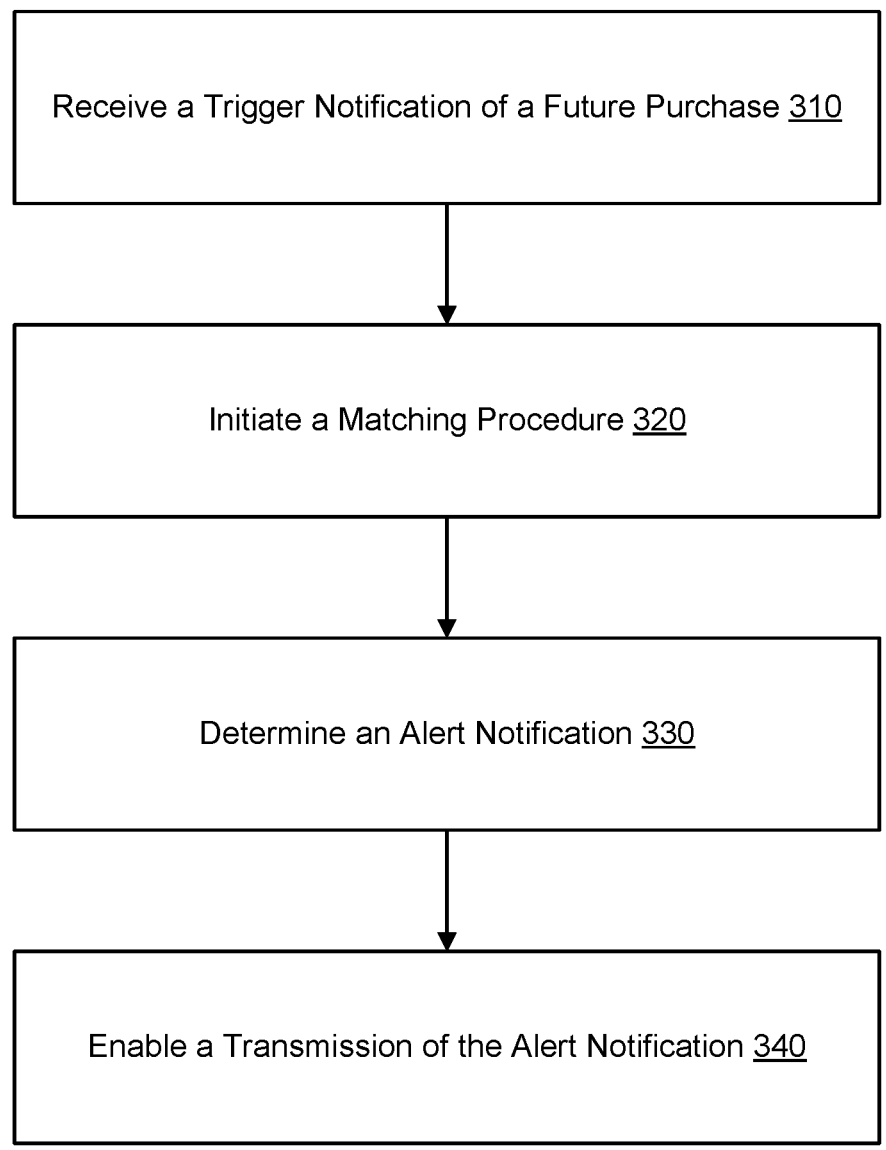
FIG. 3 is an illustrative process for a manufacturer user device, in accordance with the embodiments disclosed herein.

FIG. 3 is an illustrative process for a manufacturer user device, in accordance with the embodiments disclosed herein. In some examples, the process illustrated may be performed by connection and communication platform 110 on behalf of manufacturer user device 130 that interacts with the platform.

At block 310, a trigger notification may be received. For example, connection and communication platform 110 may receive a trigger notification of a future purchase of an item type. The future purchase may be associated with a user device (e.g., consumer user device 134).

At block 320, a matching procedure may be initiated. For example, connection and communication platform 110 may initiating a matching procedure that correlates the item type with an item identifier in an item database of an item manufacturer. The matching procedure may be initiated upon receiving the trigger notification.

At block 330, an alert notification may be determined. For example, connection and communication platform 110 may determine an alert notification associated with the item identifier of the item manufacturer.

At block 340, a transmission of the alert notification may be enabled. For example, connection and communication platform 110 may enable the transmission of the alert notification to the user device.

Figure 4:
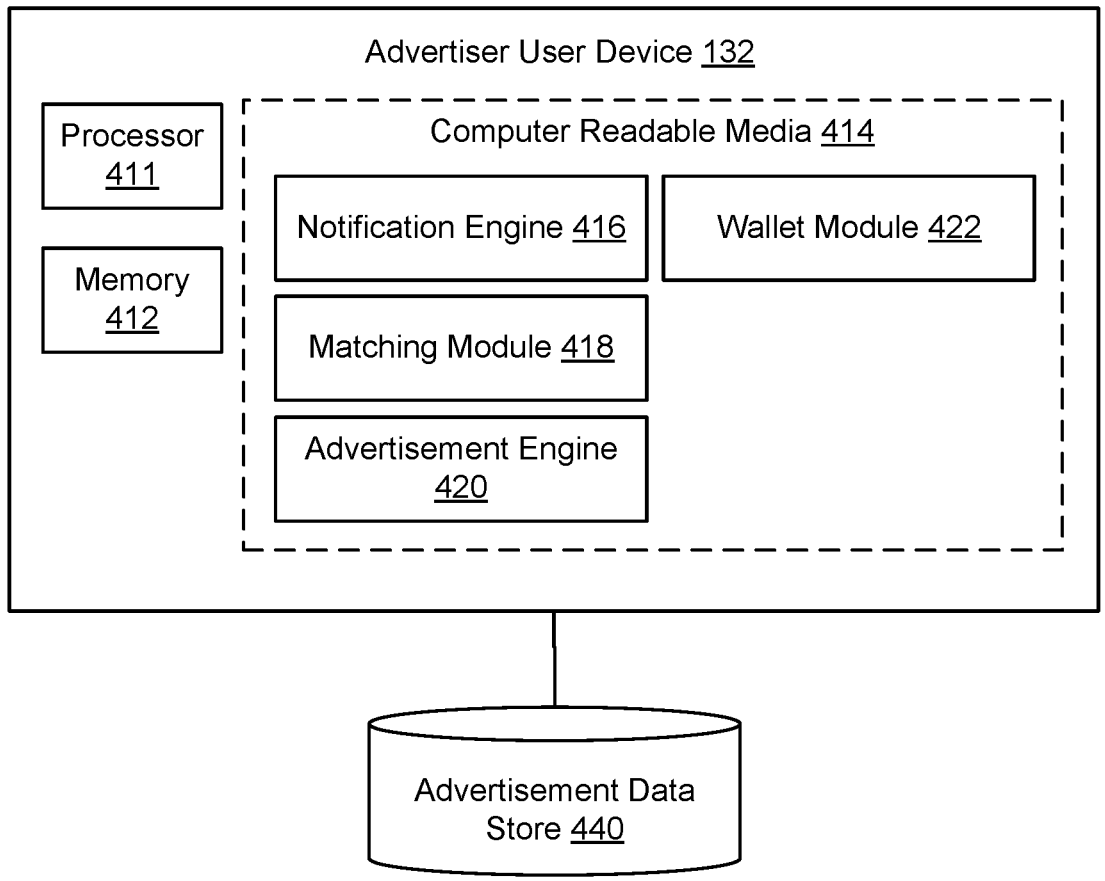
FIG. 4 is an illustrative advertiser user device, in accordance with the embodiments disclosed herein.

FIG. 4 is an illustrative advertiser user device, in accordance with the embodiments disclosed herein. As illustrated, some of the processing may be implemented at advertiser user device 132 or may remain at connection and communication platform 110. Advertiser user device 132 may include processor 411, memory 412, and computer readable media 414 comprising a plurality of engines and modules to enable functionality described throughout the disclosure. For example, computer readable media 414 may include notification engine 416, matching module 418, advertisement engine 420, and wallet module 422.

Notification engine 416 is configured to receive a trigger notification to generate an advertisement of an item type. The trigger notification may be routed to advertiser user device 132 to generate the advertisement.

In some examples, the trigger notification is routed to an advertising exchange computer network associated with a plurality of advertiser user devices 132. The advertising exchange computer network may be a distributed set of computing devices, each of which are associated with a single advertiser user device 132. In some examples, the advertising exchange computer network may correspond with a digital marketplace that enables a plurality of advertiser user devices 132 (e.g., including advertisers, publishers, offer/coupon entities, affiliate networks, etc.) to buy and sell advertising space in real-time (e.g., through a real-time auction of the advertising space, etc.).

In some examples, the advertising exchange computer network may correspond with a digital marketplace that enables a plurality of advertiser user devices 132 (e.g., including advertisers, publishers, offer/coupon entities, affiliate networks, etc.) to buy and sell advertising space in real-time (e.g., through a real-time auction of the advertising space, etc.). In some examples, advertisements may be provided by the plurality of advertiser user devices 132.

Matching module 418 is configured to generate metadata of the advertisement that identifies the item type associated with the advertisement. The advertisement with the metadata may be transmitted back to the platform 110 that can initiate a matching procedure that correlates the item type with a set of advertisements generated by advertisers (e.g., received in an advertising exchange computer network, etc.). In some examples, the item type can be considered a user keywords that is matched to information included in the advertisement that is relevant to the consumer user.

Advertisement engine 420 is configured to generate a set of advertisements and provide the set of advertisements to the consumer user device. In some examples, advertisement engine 420 may receive a selection of one more advertisement(s) from the set of advertisements and the plurality of advertiser user devices 132 may provide one or more advertisements in response.

The advertisement may comprise an item identifier, a manufacturer, a value (e.g., a discount offer to apply to the price of a future purchase for a particular item type, a coupon to provide to an item manufacturer for a particular item type, etc.), a monetary reward, and a time range that the advertisement is active. The advertisements may be stored in advertisement data store 128 in FIG. 1 and/or advertisement data store 440 in FIG. 4 (e.g., item type, advertisement information, time frame, manufacturer, etc.).

Advertisement engine 420 is configured to associate a time range for applying the advertisement to the future purchase and store the time range as metadata with the advertisement. For example, the time range may start when the selection is received from the consumer user device and cover a predetermined time range (e.g., 24 hours, etc.) such that the discount associated with the advertisement may only apply if a confirmation of the future purchase is received within the time range (e.g., an image of a sales receipt from the manufacturer, etc.). When the future purchase is made within the time limit, the monetary reward for completing the purchase may be transmitted from a first digital wallet (e.g., advertiser, manufacturer, merchant, platform operator, etc.) to the digital wallet associated with the consumer user, as described with wallet module 422.

Wallet module 422 is configured to track funds and initiate transfers between digital wallets that are associated with users. For example, a first digital wallet may be associated with consumer user device 134 and a second digital wallet may be associated with advertiser user device 132.

Advertisement data store 440 may comprise information on one or more advertisements available to provide to consumer users. The advertisement(s) may be selected based on an item type identified by the consumer user to apply to a future purchase. Information on the plurality of advertisements may comprise, for example, item name, item type, item description, advertisement image (e.g., to display at the consumer device, etc.), time range that limits the applicability of the offer, and price.

Figure 5:
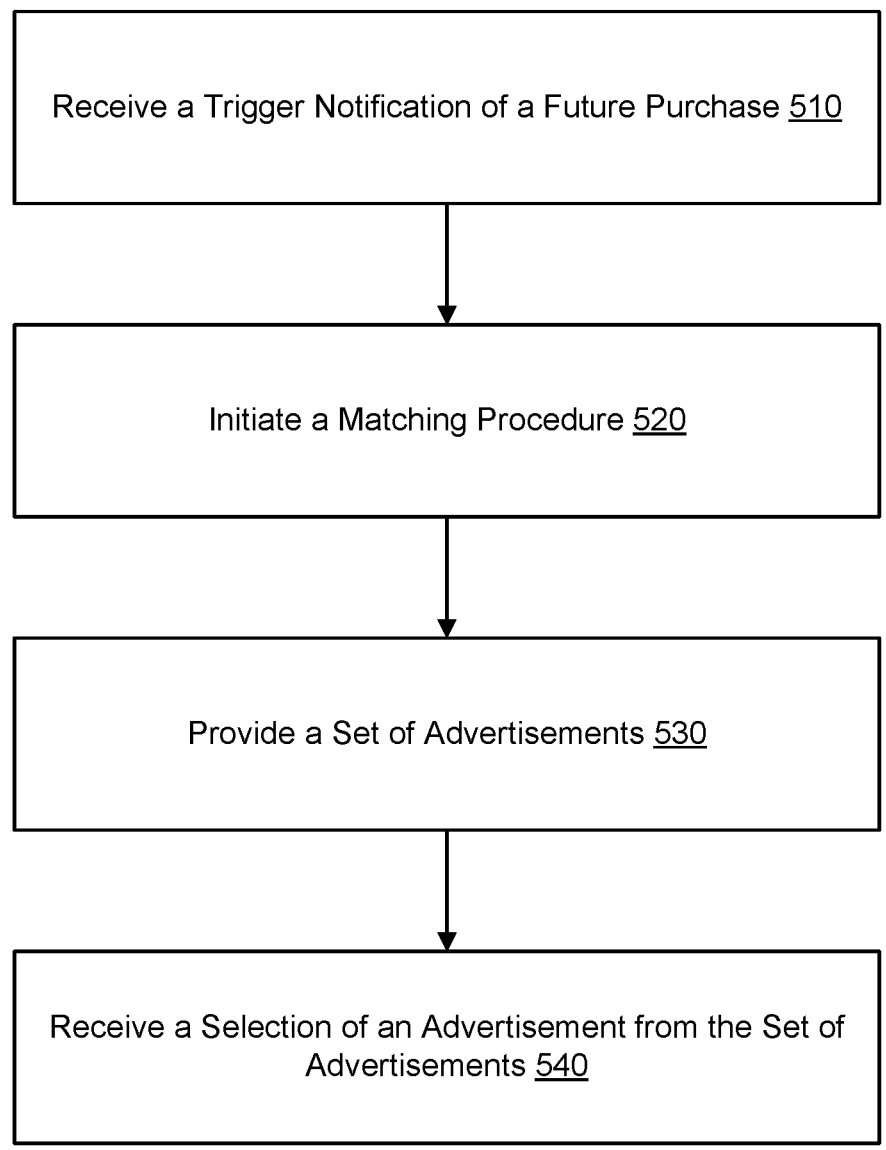
FIG. 5 is an illustrative process for an advertiser user device, in accordance with the embodiments disclosed herein.

FIG. 5 is an illustrative process for an advertiser user device, in accordance with the embodiments disclosed herein. In some examples, the process illustrated may be performed by connection and communication platform 110 on behalf of advertiser user device 132 that interacts with the platform.

At block 510, a trigger notification may be received. For example, connection and communication platform 110 may receive a trigger notification of a future purchase of an item type. The future purchase may be associated with a user device (e.g., consumer user device 134).

At block 520, a matching procedure may be initiated. For example, connection and communication platform 110 may initiating a matching procedure that correlates the item type with a set of advertisements generated by an item advertiser (e.g., advertiser user device 132). The matching procedure may be initiated upon receiving the trigger notification.

At block 530, a set of advertisements may be provided. For example, connection and communication platform 110 may provide the set of advertisements to the user device (e.g., consumer user device 134).

At block 540, a selection of an advertisement may be received. For example, connection and communication platform 110 may receive a selection of a first advertisement from the set of advertisements. The selection may identify an item identifier associated with the first advertisement that will be acquired as the future purchase in association with the user device.

FIG. 6 is an illustrative consumer user device, in accordance with the embodiments disclosed herein. As illustrated, some of the processing may be implemented at consumer user device 134 or may remain at connection and communication platform 110. Consumer user device 134 may include processor 611, memory 612, camera 613, and computer readable media 614 comprising a plurality of engines and modules to enable functionality described throughout the disclosure. For example, computer readable media 614 may include search engine 616, future purchase engine 618, advertisement engine 620, wallet module 622, and payments module 624.

Camera 613 may be configured to capture an image of a receipt or other proof of a purchase. Camera 613 may generate the image and, in some examples, may initiate an optical character recognition (OCR) process to recognize the text included in the image. The image and/or text associated with the image may be transmitted to connection and communication platform 110 for further analysis (e.g., confirming that the item purchased is the same item associated with the advertisement selected by the consumer user, etc.).

Search engine 616 is configured to receive search criteria from a user interface of the user device (e.g., consumer user device, used interchangeably) where the search criteria corresponds with an item type. In some examples, the search criteria may be based on a recommendation initiated by the consumer user device or the platform based on usage history by the consumer user. In other words, the search criteria may be based on direct user input (e.g., natural language search) or indirect user input (e.g., the usage history or inferred product/item type preferences of the consumer user). The search criteria may be provided to the platform to initiate a matching procedure that correlates the item type with various information, including a set of advertisements from a set of item manufacturers (e.g., received in an advertising exchange computer network, etc.), vendors, merchants, or other parties that may provide advertisements for items.

Future purchase engine 618 is configured to provide information associated with a purchase that the consumer user had previously identified as a future purchase. The future purchase information may identify an item identifier associated with the first advertisement that the consumer user asserts will be acquired as a future purchase. In some examples, the future purchase is limited to a predetermined time frame from receiving the selection of the first advertisement.

The information associated with the purchase may include, for example, an image of a receipt confirming that the product or item type was purchased. The information may be matched to the information in the advertisement provided by the advertiser user and verified. The purchase engine 618 is configured to communicate with wallet module to provide a confirmation of the future purchase from the user device and initiate a credit transfer to a wallet account associated with the user device.

Advertisement engine 620 is configured to provide the set of advertisements to a user interface of the user device and receive a selection of one or more advertisement(s) from the set of advertisements from the consumer user. In some examples, the consumer user may view each advertisement of the set of advertisements and select one or more from the set. The device may display the advertisements at the graphical user interface and allow interaction with the advertisements. The advertisement may be selected by consumer user device 134 and the selection may be transmitted back to advertisement module 120. Advertisement module 120 may associate the advertisement with the consumer user.

The interactions may be tracked as an interaction value. The interaction value may comprise an aggregation of the interactions that the consumer user conducts with the user interface to search with some search criteria for a particular product or item type. In some examples, platform 110 may determine the aggregation of the interactions as the interaction value of the search criteria by quantifying the number of interactions across websites by the consumer user device. Each set of searches may be grouped by the search criteria, such that an interaction value is determined for each search criteria.

In some examples, advertisement engine 620 is configured to receive filtered advertisements based on a location of consumer user device 134. For example, a geolocation (dynamic) and/or mailing location (static) may be identified for consumer user device 134. The advertisements within a location range may be determined and provided to consumer user device 134 for selection. In another example, the advertisement may be targeted to the consumer user device based on previous interaction activities, consumer user characteristics, or other features that may correlate the advertisement to the consumer user.

Wallet module 622 is configured to receive funds for the consumer user. The funds from the digital wallet may be transferred to a digital wallet or account that is external to connection and communication platform 110 as well (e.g., via Automated Clearing House (ACH) transfer, etc.).

Payments module engine 624 is configured to allow consumers to input a payment instrument in a data store (e.g., a debit card, credit card, or online payment method such as) PayPal®). Such information may be collected and handled by a secure consumer payment partner ("CPP") or third party device (e.g., Mastercard Transaction Notifications, Checkout.com, and the PayPal Developer API). In some examples, connection and communication platform 110 may integrate with the secure consumer payment partner or third party device using financial module 122 of connection and communication platform 110, as described herein.

The information associated with a payment instrument may be transmitted to financial module 122 in FIG. 1. For example, the consumer user may complete the future purchase following specific checkout instructions using a payment method on file with or issued by connection and communication platform 110. Payments module engine 624 may transmit the information associated with the financial transaction events (e.g., authentication, authorization, charge, settlement, reversal, dispute, etc.) generated on that payment method to financial module 122 in FIG. 1.

Accepted advertisement data store 640 may comprise information on one or more advertisements selected by the consumer user to apply to a future purchase. Information on the plurality of advertisements may comprise, for example, item type, item description, time range that limits the applicability of the offer, start time of the time range (e.g., when the advertisement was selected), end time of the time range (e.g., when the advertisement will expire), and price.

Figure 7:
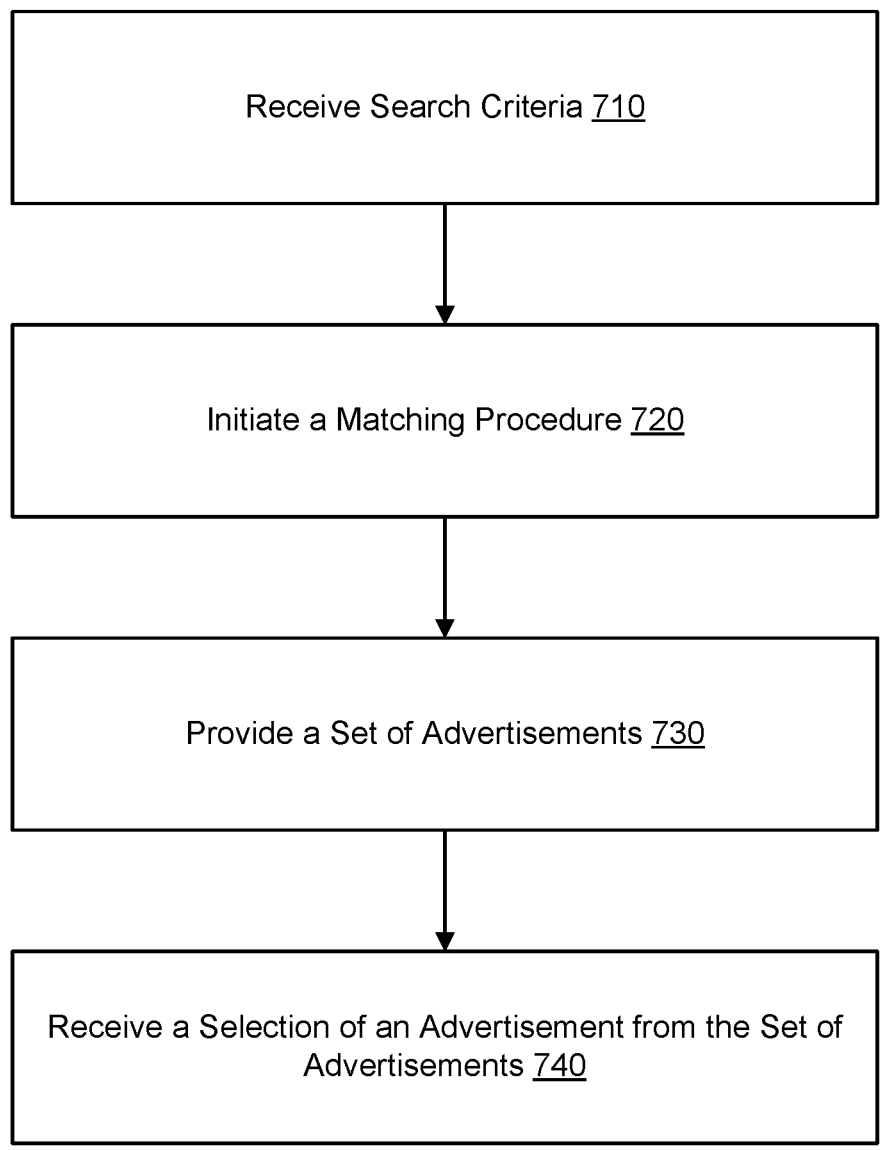
FIG. 7 is an illustrative process for a consumer user device, in accordance with the embodiments disclosed herein.

FIG. 7 is an illustrative process for a consumer user device, in accordance with the embodiments disclosed herein. In some examples, the process illustrated may be performed by connection and communication platform 110 on behalf of consumer user device 134 that interacts with the platform or by a software application that is uploaded locally to consumer user device 134.

At block 710, search criteria may be received. For example, connection and communication platform 110 may receive search criteria from a user device (e.g., consumer user device 134). The search criteria may be based on direct user input (e.g., natural language search) or indirect user input (e.g., the usage history or inferred product/item type preferences of the consumer user). In some examples, the search criteria may correspond with an item type (e.g., "jeans," "books," etc.).

At block 720, a matching procedure may be initiated. For example, connection and communication platform 110 may initiate a matching procedure that correlates the item type with a set of advertisements from manufacturers or advertisers. The matching procedure may be initiated upon receiving the trigger notification.

At block 730, a set of advertisements may be provided. For example, connection and communication platform 110 may provide the set of advertisements to the user device.

At block 740, a selection of an advertisement from the set of advertisements may be received. For example, connection and communication platform 110 may receive a selection of a first advertisement from the set of advertisements. The selection may identify an item identifier associated with the first advertisement that will be acquired as a future purchase in association with the user device.

Figure 8:
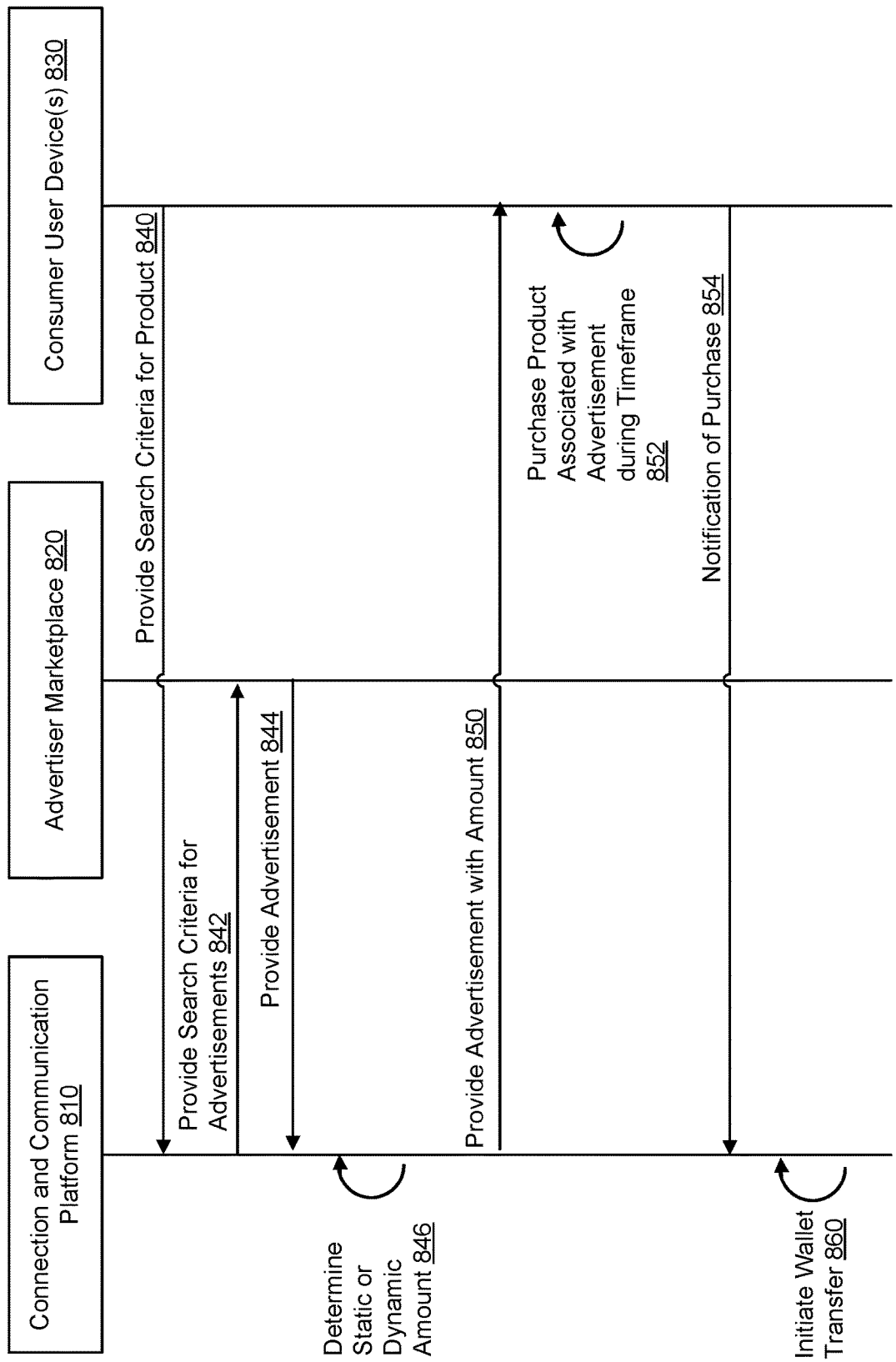
FIG. 8 is an illustrative process for implementing option pricing, in accordance with the embodiments disclosed herein.

FIG. 8 is an illustrative process for implementing option pricing, in accordance with the embodiments disclosed herein. In this example, connection and communication platform 810 and consumer user device 830 may correspond with connection and communication platform 110 and consumer user device 136 in FIG. 1, respectively.

Advertiser marketplace 820 may correspond with a computational-based collection of advertiser user devices 134 in FIG. 1 that provide advertisements to a shared document or system. The implementation details of advertiser marketplace 820 may vary, including implementation via a distributed computing environment, blockchain, mesh network, or other specialized, real-time communication system. Additional information associated with advertiser marketplace 820 is provided in U.S. patent application Ser. No. 17/689, 149, which is herein incorporated by reference in its entirety.

At block 840, search criteria for a product may be provided by consumer user device 830 to connection and communication platform 810. The search criteria may be based on direct user input (e.g., natural language search) or indirect user input (e.g., the usage history or inferred product/item type preferences of the consumer user). In some examples, the search criteria may correspond with an item type (e.g., "jeans," "books," etc.).

At block 842, the search criteria may be provided to advertiser marketplace 820. The search criteria may be used to search for advertisements that advertiser user devices have uploaded to advertiser marketplace 820.

At block 844, advertiser marketplace 820 may provide an advertisement to connection and communication platform 810. In some examples, the advertisement may be provided as a link to the advertisement that is accessible through a user device browser application or other software application that is stored locally at the user device, or the advertisement may be provided as an image/text file.

At block 846, connection and communication platform 810 may determine a static cashback amount or a dynamic cashback amount for each advertisement received from advertiser marketplace 820. The static cashback amount or the dynamic cashback amount may be calculated using any method described herein (e.g., eCPA, CPA-var, PLE, and RPE algorithms).

At block 850, connection and communication platform 810 may provide the advertisement with each cashback amount to consumer user device 830. Each advertisement may be displayed at the user device for selection by the consumer user. In some examples, a plurality of advertisements may be provided to the user as an ordered list. The ordered list may be sorted such that the largest static or dynamic cashback amount is provided at the top of the display, and so on.

At block 852, the consumer user may purchase a product associated with consumer user device 830. When the consumer user purchases a product associated with the advertisement, the consumer user may capture an image of a printed receipt or receive an electronic receipt associated with the purchase of the product at consumer user device 830.

At block 854, the image of the printed receipt or electronic receipt may be transmitted to connection and communication platform 810.

At block 860, connection and communication platform 810 may initiate a transfer of funds between wallets. For example, the funds from the advertiser associated with the selected advertisement by the user may be transferred to the wallet associated with the consumer user that purchased the product. The wallet of the consumer user may receive the funds from the advertiser user associated with the advertisement selected by the user.

Figure 9:
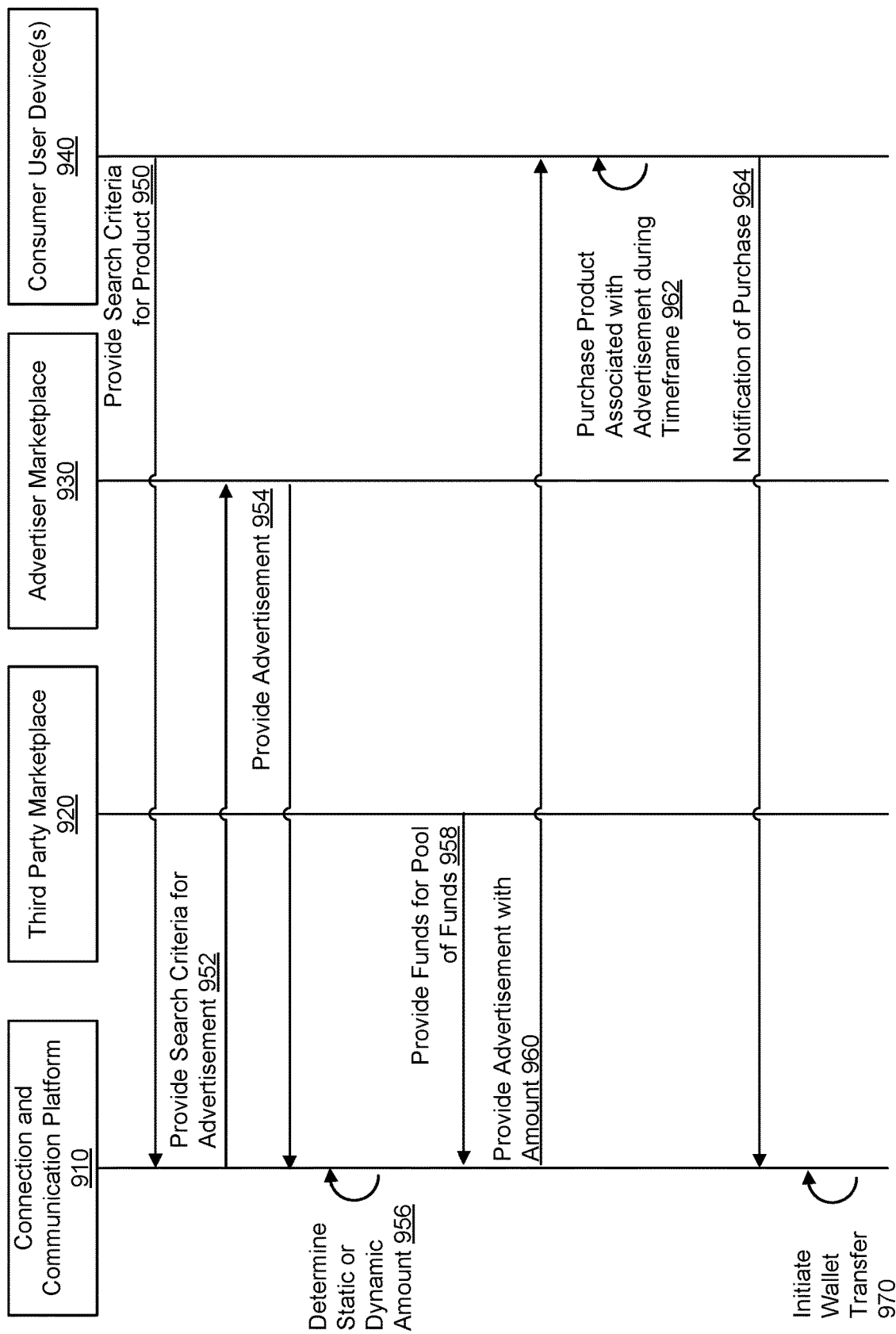
FIG. 9 is an illustrative process for implementing a pool of risk, in accordance with the embodiments disclosed herein.

FIG. 9 is an illustrative process for implementing a pool of risk, in accordance with the embodiments disclosed herein. In this example, connection and communication platform 910 and consumer user device 940 may correspond with connection and communication platform 110 and consumer user device 136 in FIG. 1, respectively.

Third party marketplace 920 may correspond with a computational-based collection of third party user devices 136 in FIG. 1 that provide funds to a pool of funds that may be transferred between a first wallet of the third party and a second wallet of the consumer user. The implementation details of third party marketplace 920 may vary, including implementation via a distributed computing environment, blockchain, mesh network, or other specialized, real-time communication system.

Advertiser marketplace 930 may correspond with a computational-based collection of advertiser user devices 134 in FIG. 1 that provide advertisements to a shared document or system. The implementation details of advertiser marketplace 930 may vary, including implementation via a distributed computing environment, blockchain, mesh network, or other specialized, real-time communication system. Additional information associated with advertiser marketplace 930 is provided in U.S. patent application Ser. No. 17/689,149, which is herein incorporated by reference in its entirety.

At block 950, search criteria for product may be provided by consumer user device 940 to connection and communication platform 910. The search criteria may be based on direct user input (e.g., natural language search) or indirect user input (e.g., the usage history or inferred product/item type preferences of the consumer user). In some examples, the search criteria may correspond with an item type (e.g., "jeans," "books," etc.).

At block 952, the search criteria may be provided to advertiser marketplace 930. The search criteria may be used to search for advertisements that advertiser user devices have uploaded to advertiser marketplace 930.

At block 954, advertiser marketplace 930 may provide an advertisement to connection and communication platform 910.

At block 956, connection and communication platform 810 may determine a static cashback amount or a dynamic cashback amount for each advertisement received from advertiser marketplace 930. The static cashback amount or the dynamic cashback amount may be calculated using any method described herein (e.g., eCPA, CPA-var, PLE, and RPE algorithms).

At block 958, third party marketplace 920 may transfer funds to a pool of funds managed by connection and communication platform 910. The third party entities that participate in third party marketplace 920 may each have their own wallet to transfer funds from their possession to the pool of funds.

At block 960, connection and communication platform 910 may provide the advertisement with each cashback amount to consumer user device 940. Each advertisement may be displayed at the user device for selection by the consumer user. In some examples, a plurality of advertisements may be provided to the user as an ordered list. The ordered list may be sorted such that the largest static or dynamic cashback amount is provided at the top of the display, and so on.

At block 962, the consumer user may purchase a product associated with consumer user device 940. When the consumer user purchases a product associated with the advertisement, the consumer user may capture an image of a printed receipt or receive an electronic receipt associated with the purchase of the product at consumer user device 940.

At block 964, the image of the printed receipt or electronic receipt may be transmitted to connection and communication platform 910.

At block 970, connection and communication platform 910 may initiate a transfer of funds between wallets. For example, the funds from the third party user that assumed the risk associated with funding the cashback amount for the advertisement selected by the user may be transferred to the wallet associated with the consumer user that purchased the product. In other examples, the funds may be transferred from a wallet associated with the pool of funds, where the third party entity transferred the funds at a prior time to the transaction of the consumer. The wallet of the consumer user may receive the funds associated with the advertisement selected by the user.

Technical improvements are realized throughout the application. For example, the implementation of an advertiser marketplace or a third party marketplace would not be possible without a computing environment. Each marketplace implementation by the connection and communication platform enables real-time communications and transmissions of electronic communications between various, distributed parties that would not be possible without the non-standard technical environment described herein.

Additionally, as discussed previously, the platform overall may help reduce electronic processing and communications by associating a future purchase (e.g., that the consumer user pre-emptively identifies) with an advertisement for the item type involved in the future purchase. The platform may not need to process millions of digital interactions between the consumer user device and other platforms (e.g., social media, purchase histories, etc.) in order to predict or infer what item type(s) the user might purchase within a limited time frame because the consumer user may explicitly inform the platform of this information. The platform may be simplified and scaled down, resulting in fewer processing resources needed to determine this information, fewer electronic communications and models, and improved data accuracy and consumer users' transactional conversion ratios overall.

Figure 10:
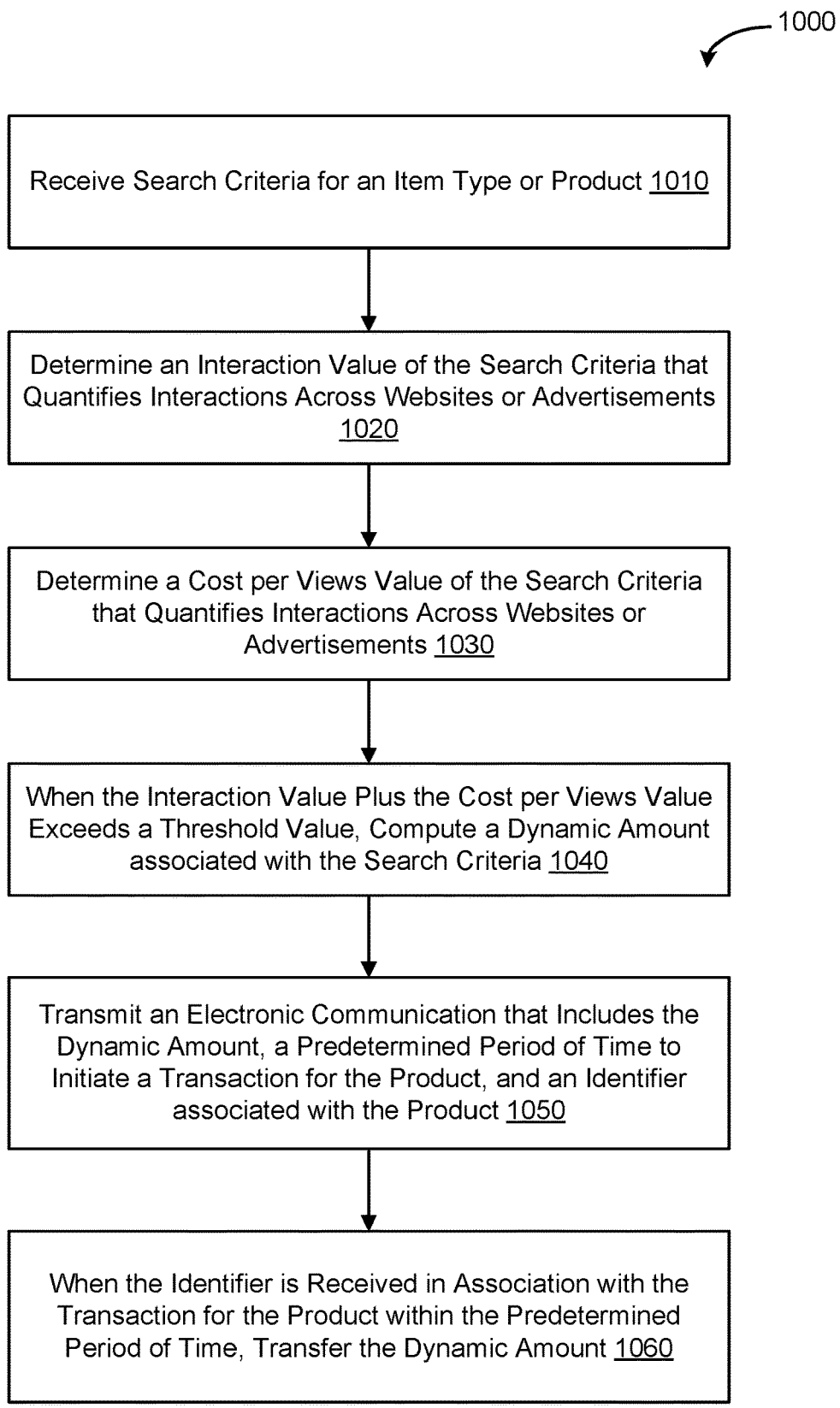
FIG. 10 is an illustrative process for implementing option pricing, in accordance with the embodiments disclosed herein.

FIG. 10 is an illustrative process for implementing option pricing, in accordance with the embodiments disclosed herein. In example 1000, connection and communication platform 110 of FIG. 1 may perform these or other steps in accordance with the description provided herein. Connection and communication platform 110 may perform the steps in communication with one or more manufacturer user devices 130, one or more advertiser user devices 132, and one or more consumer user devices 134 via network 140.

At block 1010, the method may receive search criteria for an item type or product. For example, the search criteria for an item type or a product may be received by the connection and communication platform from a consumer user device.

At block 1020, the method may determine an interaction value of the search criteria that quantifies interactions across websites or advertisements. For example, the interaction value of the search criteria for the consumer user device may be determined. The interaction value may help to quantify a first number of interactions across websites or advertisements by the consumer user device. In some examples, the first number of interactions across the websites or advertisements may be related to searches for the item type or the product by the consumer user device.

At block 1030, the method may determine a cost per views value of the search criteria that quantifies interactions across websites or advertisements. For example, the cost per views value of the search criteria may be determined. The cost per views value may help to quantify a second number of interactions across websites or advertisements by other user devices. In some examples, the second number of interactions across the websites or advertisements may be related based on the item type or the product.

At block 1040, the method may compute a dynamic amount associated with the search criteria when the interaction value plus the cost per views value exceeds a threshold value. For example, the dynamic amount may correspond with a dynamic cashback amount. The dynamic amount may be stored in an aggregation revenue pool of funds associated with an advertiser marketplace.

At block 1050, the method may transmit an electronic communication that includes the dynamic amount, a predetermined period of time to initiate a transaction for the product, and an identifier associated with the product. For example, the electronic communication may include the dynamic cashback amount, a predetermined period of time to initiate a transaction for the product, and an identifier associated with the product.

Figure 11:
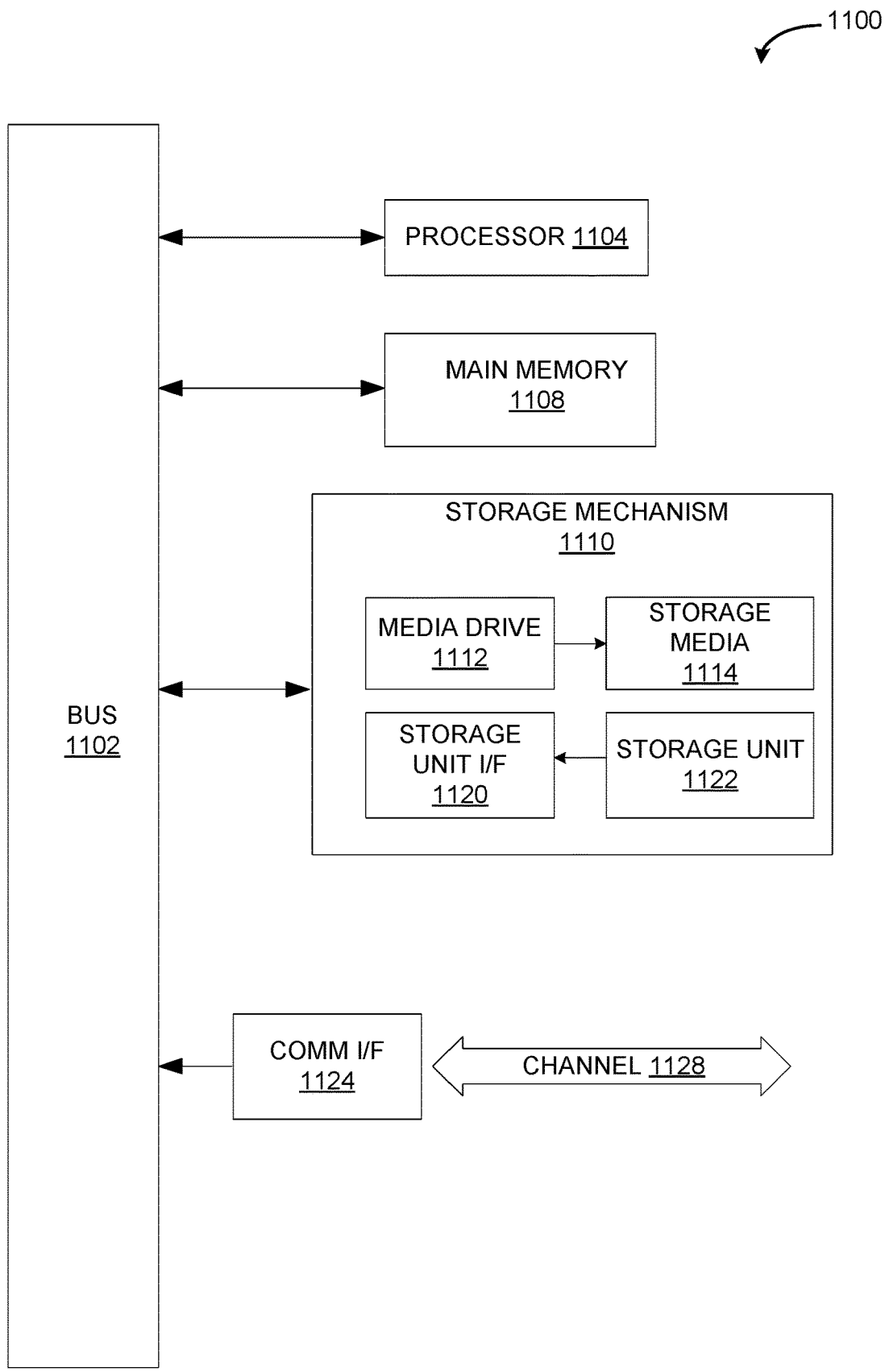
FIG. 11 is an example of a computing system that may be used in implementing various features of embodiments of the disclosed technology.

At block 1060, the method may transfer the dynamic amount. For example, when the identifier associated with the product is received in association with the transaction of the product within the predetermined of time, the method may transfer the dynamic amount. The dynamic amount may be transferred from the aggregation revenue pool of funds to a digital wallet of the consumer user.

Where components, logical circuits, or engines of the technology are implemented in whole or in part using software, in one embodiment, these software elements can be implemented to operate with a computing or logical circuit capable of carrying out the functionality described with respect thereto. One such example logical circuit is shown in FIG. 11. Various embodiments are described in terms of this example logical circuit 1100. After reading this description, it will become apparent to a person skilled in the relevant art how to implement the technology using other logical circuits or architectures.

Referring now to FIG. 11, computing system 1100 may represent, for example, computing or processing capabilities found within desktop, laptop, and notebook computers; hand-held computing devices (PDA's, smart phones, cell phones, palmtops, etc.); mainframes, supercomputers, workstations, or servers; or any other type of special-purpose or general-purpose computing devices as may be desirable or appropriate for a given application or environment. Logical circuit 1100 might also represent computing capabilities embedded within or otherwise available to a given device. For example, a logical circuit might be found in other electronic devices such as, for example, digital cameras, navigation systems, cellular telephones, portable computing devices, modems, routers, WAPs, terminals and other electronic devices that might include some form of processing capability.

Computing system 1100 might include, for example, one or more processors, controllers, control engines, or other processing devices, such as a processor 1104. Processor 1104 might be implemented using a general-purpose or special-purpose processing engine such as, for example, a microprocessor, controller, or other control logic. In the illustrated example, processor 1104 is connected to a bus 1102, although any communication medium can be used to facilitate interaction with other components of logical circuit 1100 or to communicate externally.

Computing system 1100 might also include one or more memory engines, simply referred to herein as main memory 1108. For example, preferably random-access memory (RAM) or other dynamic memory, might be used for storing information and instructions to be executed by processor 1104. Main memory 1108 might also be used for storing temporary variables or other intermediate information during execution of instructions to be executed by processor 1104. Logical circuit 1100 might likewise include a read only memory ("ROM") or other static storage device coupled to bus 1102 for storing static information and instructions for processor 1104.

The computing system 1100 might also include one or more various forms of information storage mechanism 1110, which might include, for example, a media drive 1112 and a storage unit interface 1120. The media drive 1112 might include a drive or other mechanism to support fixed or removable storage media 1114. For example, a hard disk drive, a floppy disk drive, a magnetic tape drive, an optical disk drive, a CD or DVD drive (R or RW), or other removable or fixed media drive might be provided. Accordingly, storage media 1114 might include, for example, a hard disk, a floppy disk, magnetic tape, cartridge, optical disk, a CD or DVD, or other fixed or removable medium that is read by, written to, or accessed by media drive 1112. As these examples illustrate, the storage media 1114 can include a computer usable storage medium having stored therein computer software or data.

In alternative embodiments, information storage mechanism 1140 might include other similar instrumentalities for allowing computer programs or other instructions or data to be loaded into logical circuit 1100. Such instrumentalities might include, for example, a fixed or removable storage unit 1122 and an interface 1120. Examples of such storage units 1122 and interfaces 1120 can include a program cartridge and cartridge interface, a removable memory (for example, a flash memory or other removable memory engine) and memory slot, a PCMCIA slot and card, and other fixed or removable storage units 1122 and interfaces 1120 that allow software and data to be transferred from the storage unit 1122 to logical circuit 1100.

Logical circuit 1100 might also include a communications interface 1124. Communications interface 1124 might be used to allow software and data to be transferred between logical circuit 1100 and external devices. Examples of communications interface 1124 might include a modem or soft modem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1124 might typically be carried on signals, which can be electronic, electromagnetic (which includes optical) or other signals capable of being exchanged by a given communications interface 1124. These signals might be provided to communications interface 1124 via a channel 1128. This channel 1128 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1108, storage unit 1120, media 1114, and channel 1128. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the logical circuit 1100 to perform features or functions of the disclosed technology as discussed herein.

Although FIG. 11 depicts a computer network, it is understood that the disclosure is not limited to operation with a computer network, but rather, the disclosure may be practiced in any suitable electronic device. Accordingly, the computer network depicted in FIG. 11 is for illustrative purposes only and thus is not meant to limit the disclosure in any respect.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical, or physical partitioning and configurations can be implemented to implement the desired features of the technology disclosed herein. Also, a multitude of different constituent engine names other than those depicted herein can be applied to the various partitions.

Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "engine" does not imply that the components or functionality described or claimed as part of the engine are all configured in a common package. Indeed, any or all of the various components of an engine, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method comprising:
   receiving, by a connection and communication platform from a consumer user device, search criteria for an item type or a product;
   determining, by the connection and communication platform, an interaction value of the search criteria for the consumer user device, the interaction value quantifying a first number of interactions across websites or advertisements by the consumer user device, and the first number of interactions across the websites or advertisements being related to searches for the item type or the product;

determining, by the connection and communication platform, a cost per views value of the search criteria, the cost per views value quantifying a second number of interactions across websites or advertisements by other user devices, and the second number of interactions across the websites or advertisements being related based on the item type or the product;

when the interaction value plus the cost per views value exceeds a first threshold value, computing a dynamic cashback amount associated with the search criteria, the dynamic cashback amount being adjusted based on a risk value of a transaction of the product and further stored in an aggregation revenue pool of funds associated with an advertiser marketplace;

transmitting, by the connection and communication platform to the consumer user device, an electronic communication that includes the dynamic cashback amount, a predetermined period of time to initiate the transaction for the product, and an identifier associated with the product;

when the identifier associated with the product is received in association with the transaction of the product within the predetermined period of time, transferring, by the connection and communication platform, the dynamic cashback amount from the aggregation revenue pool of funds to a digital wallet of the consumer user; and receiving, by the connection and communication platform from the consumer user device, an electronic proof of the transaction of the product to confirm that the product purchased in the transaction corresponds to the identifier associated with the product included in the electronic communication, wherein the electronic proof of the transaction relates to the risk value of the transaction of the product.

2. The computer-implemented method of claim 1, wherein the advertiser marketplace comprises a distributed computing environment, blockchain, mesh network, or other specialized, real-time communication system that communicatively connects a set of advertiser user devices.

3. The computer-implemented method of claim 1, wherein the search criteria for the item type or the product is associated with a search initiated by a consumer user at the consumer user device.

4. The computer-implemented method of claim 1, wherein the search criteria for the item type or the product is associated with a recommendation initiated by the connection and communication platform based on usage history by the consumer user.

5. The computer-implemented method of claim 1, further comprising:
prior to transferring the dynamic cashback amount to the digital wallet of the consumer user, reducing the dynamic cashback amount in association with the risk value of the transaction of the product.

6. The computer-implemented method of claim 1, further comprising:
determining a risk value of the consumer user associated with the transaction of the product; and
when the risk value exceeds a second threshold value, turning off the digital wallet of the consumer user.

7. The computer-implemented method of claim 1, further comprising:
determining a maximum amount of the dynamic cashback amount based on cost per thousand/mille (CPM) views or cost per click (CPC) rates as incoming funds and the dynamic cashback amount as outgoing funds.

8. A connection and communication platform comprising:
a memory; and
a processor that is configured to execute machine readable instructions stored in the memory that cause the processor to:
receive, from a consumer user device, search criteria for an item type or a product;
determine an interaction value of the search criteria for the consumer user device, the interaction value quantifying a first number of interactions across websites or advertisements by the consumer user device, and the first number of interactions across the websites or advertisements being related to searches for the item type or the product;
determine a cost per views value of the search criteria, the cost per views value quantifying a second number of interactions across websites or advertisements by other user devices, and the second number of interactions across the websites or advertisements being related based on the item type or the product;
when the interaction value plus the cost per views value exceeds a first threshold value, compute a dynamic cashback amount associated with the search criteria, the dynamic cashback amount being adjusted based on a risk value of a transaction of the product and further stored in an aggregation revenue pool of funds associated with an advertiser marketplace;
transmit, to the consumer user device, an electronic communication that includes the dynamic cashback amount, a predetermined period of time to initiate a transaction for the product, and an identifier associated with the product;
when the identifier associated with the product is received in association with the transaction of the product within the predetermined period of time, transfer the dynamic cashback amount from the aggregation revenue pool of funds to a digital wallet of the consumer user; and
receive, from the consumer user device, an electronic proof of the transaction of the product to confirm that the product purchased in the transaction corresponds to the identifier associated with the product included in the electronic communication, wherein the electronic proof of the transaction relates to the risk value of the transaction of the product.

9. The connection and communication platform of claim 8, wherein the advertiser marketplace comprises a distributed computing environment, blockchain, mesh network, or other specialized, real-time communication system that communicatively connects a set of advertiser user devices.

10. The connection and communication platform of claim 8, wherein the search criteria for the item type or the product is associated with a search initiated by a consumer user at the consumer user device.

11. The connection and communication platform of claim 8, wherein the search criteria for the item type or the product is associated with a recommendation initiated by the connection and communication platform based on usage history by the consumer user.

12. The connection and communication platform of claim 8, wherein the machine readable instructions stored in the memory further cause the processor to:
prior to transferring the dynamic cashback amount to the digital wallet of the consumer user, reduce the dynamic cashback amount in association with the risk value of the transaction of the product.

13. The connection and communication platform of claim 8, wherein the machine readable instructions stored in the memory further cause the processor to:
   determine a risk value of the consumer user associated with the transaction of the product; and
   when the risk value exceeds a second threshold value, turn off the digital wallet of the consumer user.

14. The connection and communication platform of claim 8 wherein the machine readable instructions stored in the memory further cause the processor to:
   determine a maximum amount of the dynamic cashback amount based on cost per thousand/mille (CPM) views or cost per click (CPC) rates as incoming funds and the dynamic cashback amount as outgoing funds.

15. A non-transitory computer-readable storage medium storing a plurality of instructions executable by a processor, the plurality of instructions when executed by the processor causes the processor to:
   receive, from a consumer user device, search criteria for an item type or a product;
   determine an interaction value of the search criteria for the consumer user device, the interaction value quantifying a first number of interactions across websites or advertisements by the consumer user device, and the first number of interactions across the websites or advertisements being related to searches for the item type or the product;
   determine a cost per views value of the search criteria, the cost per views value quantifying a second number of interactions across websites or advertisements by other user devices, and the second number of interactions across the websites or advertisements being related based on the item type or the product;
   when the interaction value plus the cost per views value exceeds a first threshold value, compute a dynamic cashback amount associated with the search criteria, the dynamic cashback amount being adjusted based on a risk value of a transaction of the product and further stored in an aggregation revenue pool of funds associated with an advertiser marketplace;
   transmit, to the consumer user device, an electronic communication that includes the dynamic cashback amount, a predetermined period of time to initiate a transaction for the product, and an identifier associated with the product;
   when the identifier associated with the product is received in association with the transaction of the product within the predetermined period of time, transfer the dynamic cashback amount from the aggregation revenue pool of funds to a digital wallet of the consumer user; and
   receive, from the consumer user device, an electronic proof of the transaction of the product to confirm that the product purchased in the transaction corresponds to the identifier associated with the product included in the electronic communication, wherein the electronic proof of the transaction relates to the risk value of the transaction of the product.

16. The non-transitory computer-readable storage medium of claim 15, wherein the advertiser marketplace comprises a distributed computing environment, blockchain, mesh network, or other specialized, real-time communication system that communicatively connects a set of advertiser user devices.

17. The non-transitory computer-readable storage medium of claim 15, wherein the search criteria for the item type or the product is associated with a search initiated by a consumer user at the consumer user device.

18. The non-transitory computer-readable storage medium of claim 15, wherein the search criteria for the item type or the product is associated with a recommendation based on usage history by the consumer user.

19. The non-transitory computer-readable storage medium of claim 15, wherein the processor is further caused to:
   prior to transferring the dynamic cashback amount to the digital wallet of the consumer user, reduce the dynamic cashback amount in association with the risk value of the transaction of the product.

20. The non-transitory computer-readable storage medium of claim 15, wherein the processor is further caused to:
   determine a risk value of the consumer user associated with the transaction of the product; and
   when the risk value exceeds a second threshold value, turn off the digital wallet of the consumer user.

* * * * *